US011371462B2

(12) United States Patent
Sueoka et al.

(10) Patent No.: US 11,371,462 B2
(45) Date of Patent: Jun. 28, 2022

(54) CONTROL APPARATUS AND CONTROL METHOD FOR COMPRESSION IGNITION TYPE ENGINE

(71) Applicant: Mazda Motor Corporation, Hiroshima (JP)

(72) Inventors: Masanari Sueoka, Hiroshima (JP); Junichi Taga, Higashihiroshima (JP); Hideki Omori, Hiroshima (JP); Keiji Maruyama, Hiroshima (JP); Tatsuhiro Tokunaga, Aki-gun (JP); Takuya Ohura, Hiroshima (JP); Toru Miyamoto, Higashihiroshima (JP); Tomohiro Nishida, Hiroshima (JP); Kenji Tanimura, Hiroshima (JP); Shinji Takayama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 83 days.

(21) Appl. No.: 16/808,663

(22) Filed: Mar. 4, 2020

(65) Prior Publication Data
US 2020/0318572 A1 Oct. 8, 2020

(30) Foreign Application Priority Data

Apr. 4, 2019 (JP) .............................. JP2019-072062

(51) Int. Cl.
F02D 41/40 (2006.01)
F02M 26/13 (2016.01)
(Continued)

(52) U.S. Cl.
CPC ............ *F02D 41/40* (2013.01); *F01N 13/10* (2013.01); *F02B 11/00* (2013.01); *F02D 41/401* (2013.01);
(Continued)

(58) Field of Classification Search
CPC ........ F02D 41/30; F02D 41/3011–3047; F02D 41/40; F02D 41/401; F02D 2041/3052; F02D 2041/389
(Continued)

(56) References Cited

U.S. PATENT DOCUMENTS 6,508,229 B2 * 1/2003 Miyakubo ............... F02D 37/02
123/305
7,178,507 B1 2/2007 Gangopadhyay
(Continued)

FOREIGN PATENT DOCUMENTS

JP 3873580 B2 1/2007
JP 6493488 B1 4/2019
JP 201985982 A 6/2019

OTHER PUBLICATIONS

Johansson, T., "Turbocharged HCCI Engine Improving Efficiency and Operating Range," Doctoral Thesis, Division of Combustion Engines, Department of Energy Sciences, Faculty of Engineering, Lund University, Nov. 2010, 233 pages.
(Continued)

*Primary Examiner* — Logan M Kraft
*Assistant Examiner* — Robert A Werner
(74) *Attorney, Agent, or Firm* — Alleman Hall Creasman & Tuttle LLP

(57) ABSTRACT

The control apparatus for a compression ignition type engine includes a plurality of cylinder inner pressure sensors that detect pressure in each cylinder, and a combustion control unit. The combustion control unit corrects a target fuel injection amount of each cylinder by an injector based on a deviation between a predicted combustion period that is a period from an ignition timing by an ignition plug to a predetermined mass combustion timing and that is obtained based on a preset combustion model, and an actual combustion period that is a period from the ignition timing by the
(Continued)

ignition plug to an actual combustion timing and that is obtained based on cylinder inner pressure, such that the period from the ignition timing by the ignition plug to the predetermined mass combustion timing, which is the timing when fuel having a predetermined mass ratio combusts, is equalized in each cylinder.

7 Claims, 12 Drawing Sheets

(51) Int. Cl.
    *F01N 13/10*     (2010.01)
    *F02B 11/00*     (2006.01)
    *F02P 5/05*     (2006.01)
    *F02D 41/38*     (2006.01)

(52) U.S. Cl.
    CPC ............... *F02M 26/13* (2016.02); *F02P 5/05* (2013.01); *F02D 2041/389* (2013.01)

(58) Field of Classification Search
    USPC ......... 701/103–105, 111; 123/299, 300, 305, 123/406.47, 406.48, 435; 73/114.16, 73/114.17
    See application file for complete search history.

(56) References Cited

U.S. PATENT DOCUMENTS

| | | | |
|---|---|---|---|
| 7,904,232 B2* | 3/2011 | Kemmer | F02D 41/3023 701/103 |
| 9,605,602 B2* | 3/2017 | Sixel | F02D 41/0025 |
| 2001/0017127 A1* | 8/2001 | Flynn | F02B 19/14 123/435 |
| 2008/0178843 A1 | 7/2008 | Duffy et al. | |
| 2016/0290307 A1* | 10/2016 | Urano | F02D 37/02 |
| 2016/0363077 A1* | 12/2016 | Suzuki | F02D 35/028 |
| 2016/0377013 A1 | 12/2016 | Yamashita et al. | |
| 2017/0276098 A1* | 9/2017 | Tanaka | F02D 41/3094 |
| 2019/0145338 A1* | 5/2019 | Tanaka | F02D 41/006 60/285 |
| 2019/0145367 A1* | 5/2019 | Tanaka | F02M 61/14 123/470 |

OTHER PUBLICATIONS

European Patent Office, Extended European Search Report Issued in Application No. 201603917, dated Aug. 19, 2020, Germany, 8 pages.

* cited by examiner

CONTROL APPARATUS AND CONTROL METHOD FOR COMPRESSION IGNITION TYPE ENGINE

CROSS-REFERENCE TO RELATED APPLICATION

This application is based on Japanese Patent application No. 2019-072062 filed in Japan Patent Office on Apr. 4, 2019, the contents of which are hereby incorporated by reference.

BACKGROUND OF THE INVENTION

Field of the Invention

The present invention relates to a control apparatus and a control method for a compression ignition type engine capable of compression ignition combustion in which at least a portion of mixture is combusted by self-ignition.

Background Art

In recent years, attention has been paid to HCCI combustion ("HCCI" is an abbreviation of "Homogeneous-Charge Compression Ignition") in which gasoline fuel mixed with air is sufficiently compressed and combusted by self-ignition in a combustion chamber. HCCI combustion is a mode of combustion in which mixture combusts simultaneously at multiple times, and hence HCCI combustion is said to be very advantageous in terms of thermal efficiency because the combustion speed of the mixture is faster than that of SI combustion ("SI" stands for "Spark Ignition") adopted in an ordinary gasoline engine. However, HCCI combustion has such problems as that the combustion start timing (self-ignition timing of mixture) of mixture fluctuates greatly due to external factors such as air temperature. In addition, there is also a problem that control during a transient operation in which the load changes suddenly is difficult.

Therefore, it has been proposed to combust not the entire mixture by self-ignition but to combust a portion of the mixture by spark ignition using an ignition plug. That is, a portion of mixture is forcibly combusted (SI combustion) by flame propagation triggered by spark ignition, and the rest of the mixture is combusted (CI combustion ("CI" is an abbreviation of "Compression Ignition")) by self-ignition. Hereinafter, such combustion is referred to as partial compression ignition combustion.

In order to ensure ignitability and fuel economy in partial compression ignition combustion, in this type of engine, the intake air amount is controlled such that the air-fuel ratio (A/F) becomes equal to or larger than the theoretical air-fuel ratio ($\lambda \geq 1$), and severe ignition timing control is executed. For example, Japanese Patent No. 3873580 discloses that, in an engine in which partial compression ignition combustion is performed, the optimum timing of the main combustion timing according to the operation condition, e.g., the timing at which the combustion mass ratio becomes 50% (the timing at which 50% of the fuel injected into the combustion chamber combusts), is set as a target value, and the ignition timing is controlled such that the main combustion timing becomes this target value, thereby being capable of stably achieving the compression self-ignition combustion even if the operation state changes.

In a multi-cylinder engine, fuel injection control is performed for each cylinder in order to suppress variation in torque between the cylinders. Usually, the fuel injection amount is controlled so as to equalize the air-fuel ratio (A/F) of each cylinder (referred to as A/F matching control). However, the A/F matching control may cause fuel economy deterioration and NOx increase depending on the operation state of the engine, although variation in torque between cylinders is expected to be improved. In an engine that performs partial compression ignition combustion in particular, this tendency is observed in an operation region where the air-fuel ratio becomes larger than the theoretical air-fuel ratio ($\lambda > 1$).

Accordingly, in an engine capable of partial compression ignition combustion, it is required to suppress variation in torque between cylinders while suppressing fuel economy deterioration and NOx increase.

SUMMARY OF THE INVENTION

An object of the present invention is to provide a technology capable of suppressing variation in torque between cylinders while suppressing fuel economy deterioration and NOx increase in an engine capable of partial compression ignition combustion.

Then, the present invention is a control apparatus for a compression ignition type engine that includes a plurality of cylinders, an injector injecting fuel into each of the plurality of cylinders, and an ignition plug generating a spark in each of the plurality of cylinders, a portion of air-fuel mixture in the plurality of cylinders being SI combusted by spark ignition, and then remaining mixture in the plurality of cylinders being CI combusted by self-ignition, the control apparatus including: a plurality of cylinder inner pressure sensors each detecting a pressure in each of the plurality of cylinders; and a combustion control unit controlling an ignition timing of the ignition plug such that a predetermined combustion timing becomes a target timing, and controlling a fuel injection amount by the injector such that a fuel injection amount of each of the plurality of cylinders becomes a target fuel injection amount, in which the combustion control unit corrects the target fuel injection amount of each of the plurality of cylinders based on a deviation between a predicted combustion period that is a period from the ignition timing by the ignition plug to a predetermined mass combustion timing and that is obtained based on a preset combustion model, and an actual combustion period that is a period from the ignition timing by the ignition plug to an actual combustion timing and that is obtained based on cylinder inner pressure detected by the plurality of cylinder inner pressure sensors, such that the period from the ignition timing by the ignition plug to the predetermined mass combustion timing that is a timing when fuel having a predetermined mass ratio combusts is equalized in each of the plurality of cylinders.

DETAILED DESCRIPTION OF THE PREFERRED EMBODIMENTS OF THE INVENTION

Hereinafter, an embodiment of the present invention will be described in detail with reference to the drawings.

[1. Overall Configuration of Engine]

Figure 1:
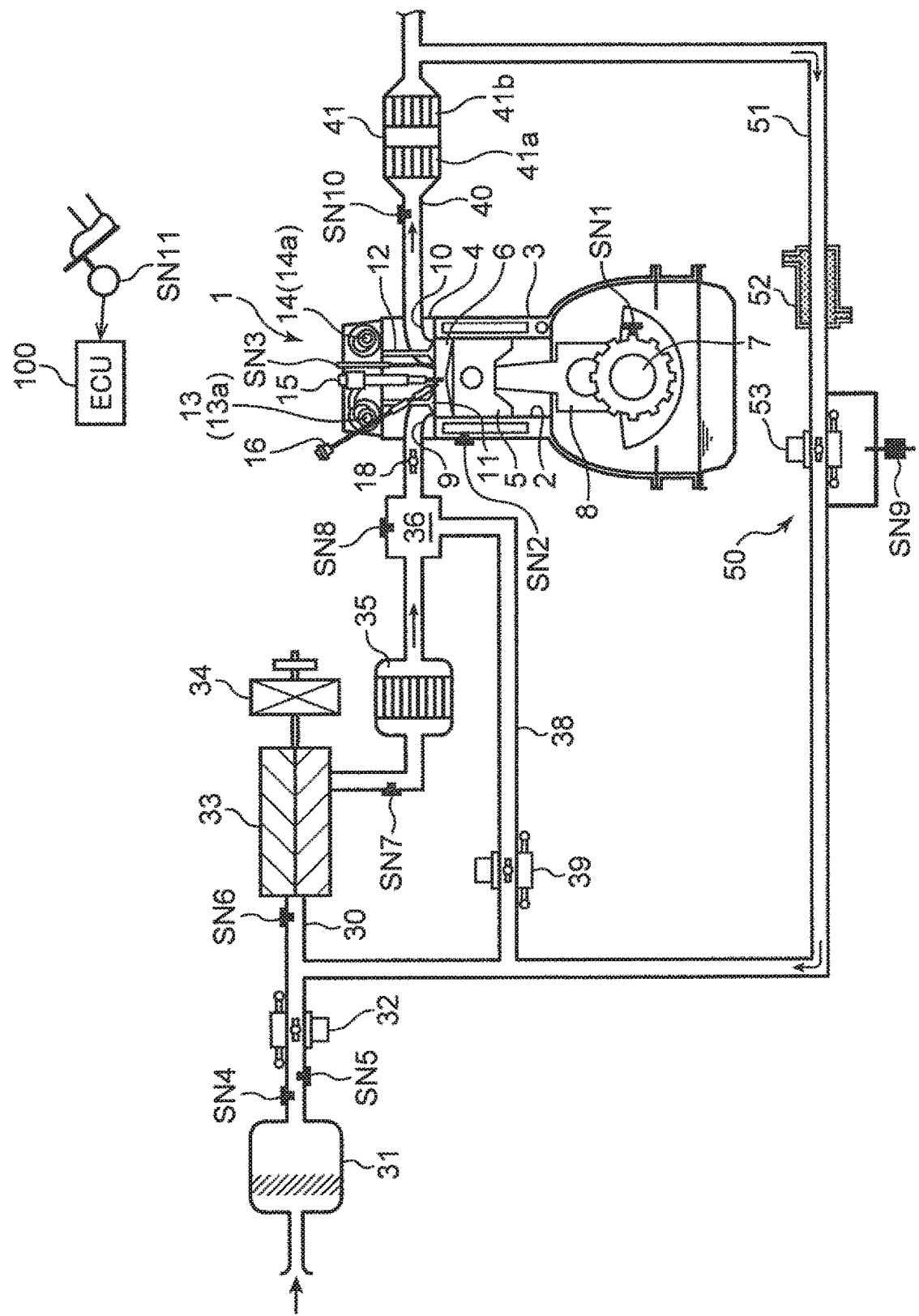
FIG. 1 is a system diagram schematically illustrating an overall configuration of a compression ignition type engine according to an embodiment of the present invention.

FIG. 1 is a diagram illustrating a preferred embodiment of a compression ignition type engine (hereinafter referred to simply as an engine) to which the control apparatus of the present invention is applied. The engine illustrated in FIG. 1 is a four-cycle gasoline direct injection engine mounted on a vehicle as a power source for traveling, and includes an engine body 1, an intake air passage 30 through which intake air introduced into the engine body 1 flows, an exhaust air passage 40 through which exhaust gas discharged from the engine body 1 flows, and an external EGR device 50 that recirculates, to the intake air passage 30, a portion of an exhaust gas flowing through the exhaust air passage 40.

The engine body 1 has a cylinder block 3 in which a cylinder 2 is formed, a cylinder head 4 attached to an upper surface of the cylinder block 3 so as to block the cylinder 2 from above, and a piston 5 inserted into the cylinder 2 in a reciprocating and sliding manner. The engine body 1 is of a multi cylinder type having four cylinders 2 (a #1 cylinder 2a to a #4 cylinder 2d) (See FIG. 2), but in FIG. 1, for the sake of simplicity, only one cylinder 2 will be focused.

A combustion chamber 6 is partitioned above the piston 5. Fuel composed mainly of gasoline is supplied to the combustion chamber 6 by injection from an injector 15 described later. The supplied fuel combusts while being mixed with air in the combustion chamber 6, and the piston 5 pushed down by the expansion force due to the combustion reciprocates in the vertical direction. It is to be noted that the fuel injected into the combustion chamber 6 is only required to contain gasoline as a main component, and may contain a subcomponent such as bioethanol in addition to gasoline, for example.

A crankshaft 7 serving as an output shaft of the engine body 1 is provided below the piston 5. The crankshaft 7 is coupled with the piston 5 via a connecting rod 8, and is rotationally driven around a central axis in accordance with the reciprocating motion (vertical motion) of the piston 5.

The geometric compression ratio of the cylinder 2, i.e., the ratio between the volume of the combustion chamber 6 when the piston 5 is at the top dead center and the volume of the combustion chamber when the piston 5 is at the bottom dead center, is set to be 13 or more and 30 or less, preferably 14 or more and 18 or less, as a value suitable for SPCCI combustion (partial compression ignition combustion) to be described later. More specifically, the geometric compression ratio of the cylinder 2 is preferably set to 14 or more and 17 or less in the case of the regular specification using gasoline fuel having an octane number of about 91, and to 15 or more and 18 or less in the case of the high octane specification using gasoline fuel having an octane number of about 96.

The cylinder block 3 is provided with a crank angle sensor SN1 that detects the rotation angle (crank angle) of the crankshaft 7 and the rotation speed (engine rotation speed) of the crankshaft 7, and a water temperature sensor SN2 that detects the temperature of cooling water (engine water temperature) flowing inside the cylinder block 3 and the cylinder head 4.

The cylinder head 4 is provided with an intake port 9 for introducing, into the combustion chamber 6, air supplied from the intake air passage 30, an exhaust port 10 for discharging, into the exhaust air passage 40, an exhaust gas generated in the combustion chamber 6, an intake valve 11 that opens and closes an opening of the intake port 9 on the combustion chamber 6 side, and an exhaust valve 12 that opens and closes an opening of the exhaust port 10 on the combustion chamber 6 side. The valve type of the present embodiment is a four-valve type of two intake valves×two exhaust valves. That is, the cylinder head 4 is provided with two intake ports 9, two intake valves 11 that opens and closes those openings, respectively, two exhaust ports 10, and two exhaust valves 12 that opens and closes those openings, respectively.

One of the two intake ports 9 is provided with an openable/closable swirl valve 18. When the swirl valve 18 is driven in the closing direction, the ratio of intake air flowing into the combustion chamber 6 from the intake port 9 to which the swirl valve 18 is not provided increases. For this reason, it is possible to enhance a swirl flow that swirls around the cylinder axis (central axis of the combustion chamber 6). Conversely, if the swirl valve 18 is driven in the opening direction, the swirl flow can be weakened. It is to be noted that the intake port 9 of the present embodiment is a tumble port capable of forming a tumble flow (longitudinal vortex). For this reason, the swirl flow formed when the swirl valve 18 is closed becomes an oblique swirl flow mixed with the tumble flow.

The intake valve 11 and the exhaust valve 12 are driven to open and close in conjunction with the rotation of the crankshaft 7 by valve mechanisms 13 and 14 including a pair of camshafts and the like arranged in the cylinder head 4. The valve mechanism 13 for the intake valve 11 includes an intake air VVT 13a capable of changing the opening/closing timing of the intake valve 11 therein. Similarly, the valve mechanism 14 for the exhaust valve 12 includes an exhaust air VVT 14a capable of changing the opening/closing timing of the exhaust valve 12 therein. The intake air VVT 13a (exhaust air VVT 14a) is so-called phase-type variable mechanism that changes the opening timing and the closing timing of the intake valve 11 (exhaust valve 12) simultaneously and by the same amount. By controlling the intake air VVT 13a and the exhaust air VVT 14a, in the present embodiment, it is possible to adjust a valve overlap period in which both the intake valve 11 and the exhaust valve 12 open across the exhaust top dead center. Adjustment of the valve overlap period allows the amount of combusted gas (internal EGR gas) remaining in the combustion chamber 6 to be adjusted.

The cylinder head 4 is provided with the injector 15 that injects fuel (mainly gasoline) into the combustion chamber 6 in the cylinder 2, and an ignition plug 16 that ignites a mixture in which fuel injected from the injector 15 into the combustion chamber 6 and air introduced into the combustion chamber 6 are mixed. The cylinder head 4 is further provided with a cylinder inner pressure sensor SN3 that detects the pressure (cylinder inner pressure) of the combustion chamber 6.

The intake air passage 30 is connected to one side surface of the cylinder head 4 so as to communicate with the intake port 9. Air (fresh air) taken in from the upstream end of the intake air passage 30 is introduced into the combustion chamber 6 through the intake air passage 30 and the intake port 9.

The intake air passage 30 is provided with an air cleaner 31 that removes foreign matters in the intake air, an openable/closable throttle valve 32 that adjusts the flow rate of the intake air, a supercharger 33 that feeds the intake air while compressing it, an intercooler 35 that cools the intake air compressed by the supercharger 33, and a surge tank 36 in order from the upstream side.

Each part of the intake air passage 30 is provided with an airflow sensor SN4 that detects the flow rate of intake air, first and second intake air temperature sensors SN5 and SN7 that detect the temperature of intake air, and first and second intake air pressure sensors SN6 and SN8 that detect the pressure of intake air. The airflow sensor SN4 and the first intake air temperature sensor SN5 are provided at a portion between the air cleaner 31 and the throttle valve 32 in the intake air passage 30, and detect the flow rate and temperature of the intake air passing through the portion. The first intake air pressure sensor SN6 is provided at a portion between the throttle valve 32 and the supercharger 33 (downstream side relative to a connection port of an EGR passage 51 described later) in the intake air passage 30, and detects the pressure of the intake air passing through the portion. The second intake air temperature sensor SN7 is provided at a portion between the supercharger 33 and the intercooler 35 in the intake air passage 30, and detects the temperature of the intake air passing through the portion. The second intake air pressure sensor SN8 is provided in the surge tank 36 and detects the pressure of the intake air in the surge tank 36.

The supercharger 33 is a mechanical supercharger that is mechanically linked with the engine body 1. The specific type of supercharger 33 is not particularly limited, but any of the known superchargers such as Lysholm, Roots, and centrifugal can be used as the supercharger 33.

An electromagnetic clutch 34 capable of electrically switching engagement and release is provided between the supercharger 33 and the engine body 1. When the electromagnetic clutch 34 is engaged, driving force is transmitted from the engine body 1 to the supercharger 33, and supercharging is performed by the supercharger 33. When the electromagnetic clutch 34 is released, on the other hand, the transmission of the driving force is cut off, and supercharging by the supercharger 33 is stopped.

The intake air passage 30 is provided with a bypass passage 38 for bypassing the supercharger 33. The bypass passage 38 connects the surge tank 36 and the EGR passage 51 described later to each other. The bypass passage 38 is provided with an openable/closable bypass valve 39.

The exhaust air passage 40 is connected to the other side surface of the cylinder head 4 so as to communicate with the exhaust port 10. The combusted gas generated in the combustion chamber 6 is discharged to the outside through an exhaust port 10 and the exhaust air passage 40. The exhaust air passage 40 is provided with a catalytic converter 41. The catalytic converter 41 includes a three-way catalyst 41a for purifying harmful components (HC, CO, and NOx) contained in the exhaust gas flowing through the exhaust air passage 40, and a gasoline particulate filter (GPF) 41b for collecting particulate matters (PM) contained in the exhaust gas.

A portion on the upstream side relative to the catalytic converter 41 in the exhaust air passage 40 is provided with a linear $O_2$ sensor SN10 that detects the concentration of oxygen contained in the exhaust gas. The linear $O_2$ sensor SN10 is a sensor of a type in which the output value linearly changes in accordance with the concentration of oxygen. The air-fuel ratio of the mixture can be estimated on the basis of the output value of the linear $O_2$ sensor SN10.

The external EGR device 50 has an EGR passage 51 connecting the exhaust air passage 40 and the intake air passage 30, and an EGR cooler 52 and an EGR valve 53 provided in the EGR passage 51. The EGR passage 51 connects a portion of the exhaust air passage 40 on the downstream side relative to the catalytic converter 41 and a portion of the intake air passage 30 between the throttle valve 32 and the supercharger 33 with each other. The EGR cooler 52 cools by heat exchange an exhaust gas (external EGR gas) recirculated from the exhaust air passage 40 to the intake air passage 30 through the EGR passage 51. The EGR valve 53 is provided in an openable and closable manner in the EGR passage 51 on the downstream side (side close to the intake air passage 30) relative to the EGR cooler 52, and adjusts the flow rate of the exhaust gas flowing through the EGR passage 51. The EGR passage 51 is provided with a differential pressure sensor SN9 for detecting a difference between the pressure on the upstream side and the pressure on the downstream side of the EGR valve 53.

Figure 2:
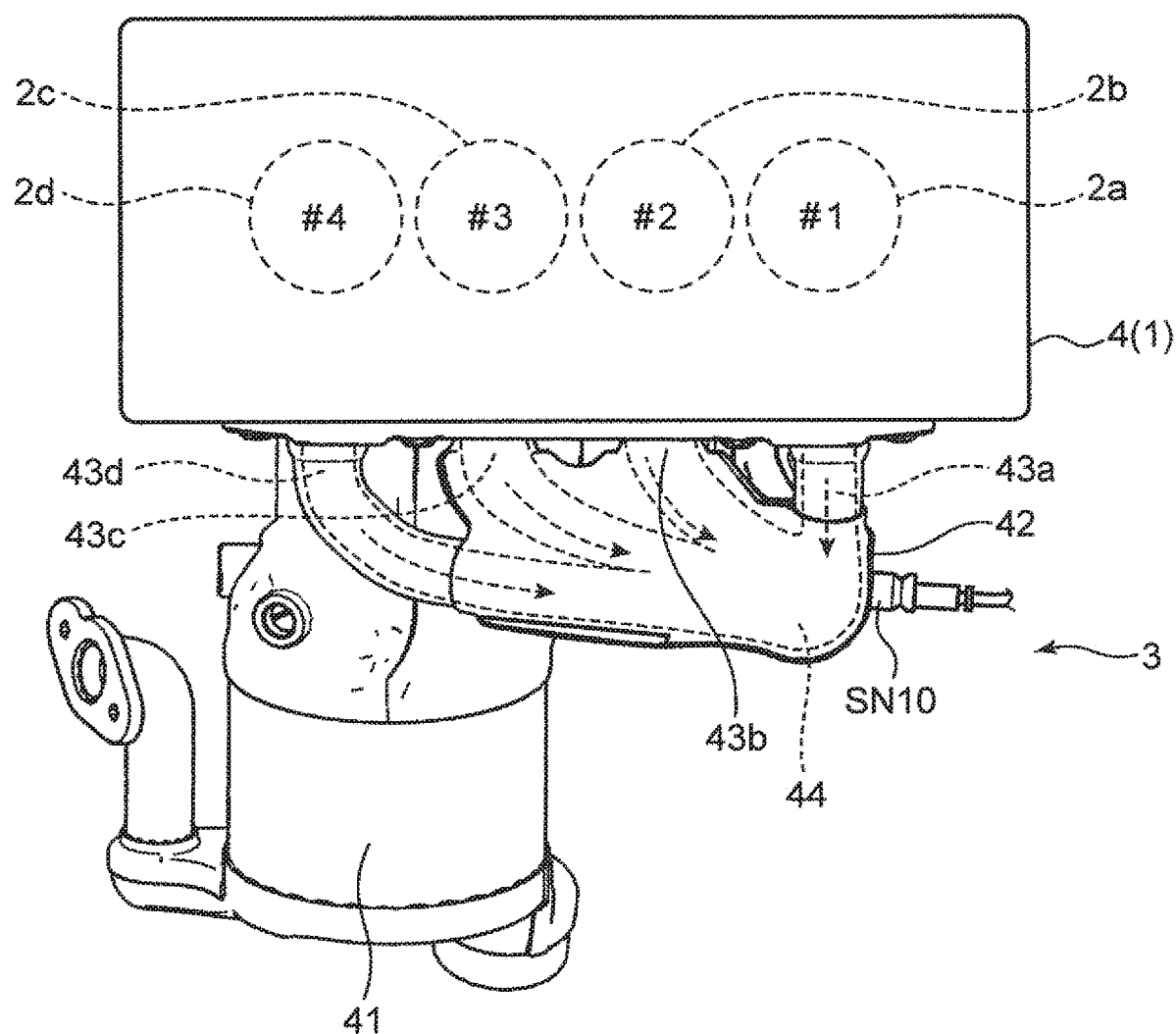
FIG. 2 is an engine main part plan view illustrating a portion of an engine body and an exhaust air passage.

FIG. 2 is an engine main part plan view illustrating a portion of the engine body 1 and the exhaust air passage 40. As illustrated in the figure, the engine body 1 has the four cylinders 2 (the #1 cylinder 2a to the #4 cylinder 2d) arrayed in a row. An exhaust manifold 42 constituting a portion of the exhaust air passage 40 is connected to the engine body 1 on the exhaust side.

The exhaust manifold 42 is connected to the side surface of the cylinder head 4 so as to communicate with the exhaust port 10. The exhaust manifold 42 includes a first exhaust pipe portion 43a communicating with the exhaust port 10 of the #1 cylinder 2a, a second exhaust pipe portion 43b communicating with the exhaust port 10 of the #2 cylinder 2b, a third exhaust pipe portion 43c communicating with the exhaust port 10 of the #3 cylinder 2c, a fourth exhaust pipe portion 43d communicating with the exhaust port 10 of the #4 cylinder 2d, and a collection portion 44 where end portions (end portions on the downstream side) of these first to fourth exhaust pipe portions 43a to 43d collect. The catalytic converter 41 is connected to the collection portion 44. That is, the combusted gases generated in the combustion chambers 6 of the cylinders 2a to 2d collect in the collection portion 44 through the exhaust pipe portions 43a to 43d, respectively, of the exhaust manifold 42 and are introduced into the catalytic converter 41 through the collection portion 44. The collection portion 44 of the exhaust manifold 42 is provided at a position closest to the #1 cylinder 2a in the array direction of the #1 cylinder 2a to the #4 cylinder 2d. In other words, the length of the first exhaust pipe portion 43a corresponding to the #1 cylinder 2a is the shortest of the lengths of the exhaust pipe portions 43a to 43d from the exhaust port 10 to the collection portion 44. That is, in the present embodiment, the #1 cylinder 2a corresponds to a "specific cylinder" of the present invention.

[2. Control System]

Figure 3:
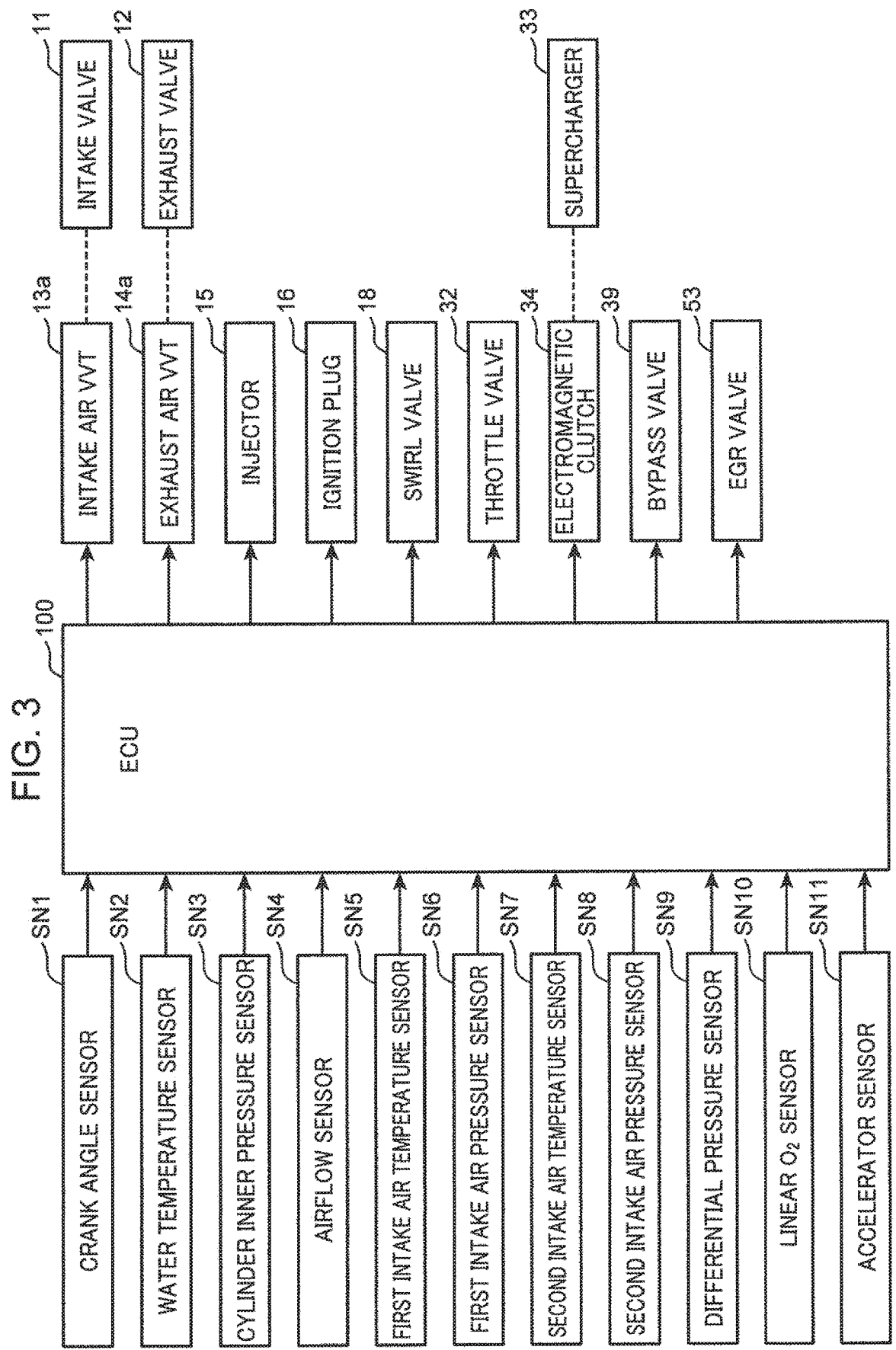
FIG. 3 is a block diagram illustrating a control system of the engine.

FIG. 3 is a block diagram illustrating a control system of the engine. An ECU 100 (controller) illustrated in the figure is a microprocessor for comprehensively controlling the engine, and includes a well-known CPU, ROM, and RAM.

Detection signals from various sensors are input to the ECU 100. For example, the ECU 100 is electrically connected with the crank angle sensor SN1, the water temperature sensor SN2, the cylinder inner pressure sensor SN3, the airflow sensor SN4, the first and second intake air temperature sensors SN5 and SN7, the first and second intake air pressure sensors SN6 and SN8, the differential pressure sensor SN9, and the linear $O_2$ sensor SN10. Information detected by these sensors (i.e., crank angle, engine rotation speed, engine water temperature, cylinder inner pressure, intake air flow rate, intake air temperature, intake air pressure, front and rear differential pressure of the EGR valve 53, oxygen concentration of the exhaust gas, and the like) is sequentially input to the ECU 100.

The vehicle is provided with an accelerator sensor SN11 that detects an opening degree of an accelerator pedal operated by the driver driving the vehicle. The detection signal from the accelerator sensor SN11 is also input to the ECU 100.

The ECU 100 controls various portions of the engine while executing various determinations, calculations, and the like on the basis of the input information from the sensors. That is, the ECU 100 is electrically connected with the intake air VVT 13a, the exhaust air VVT 14a, the injector 15, the ignition plug 16, the swirl valve 18, the throttle valve 32, the electromagnetic clutch 34, the bypass valve 39, the EGR valve 53, and the like, and outputs control signals to these devices on the basis of the results of the calculation and the like.

The ECU as described above corresponds to the "combustion control unit" of the present invention.

[3. Control According to Operation State]

Figure 4:
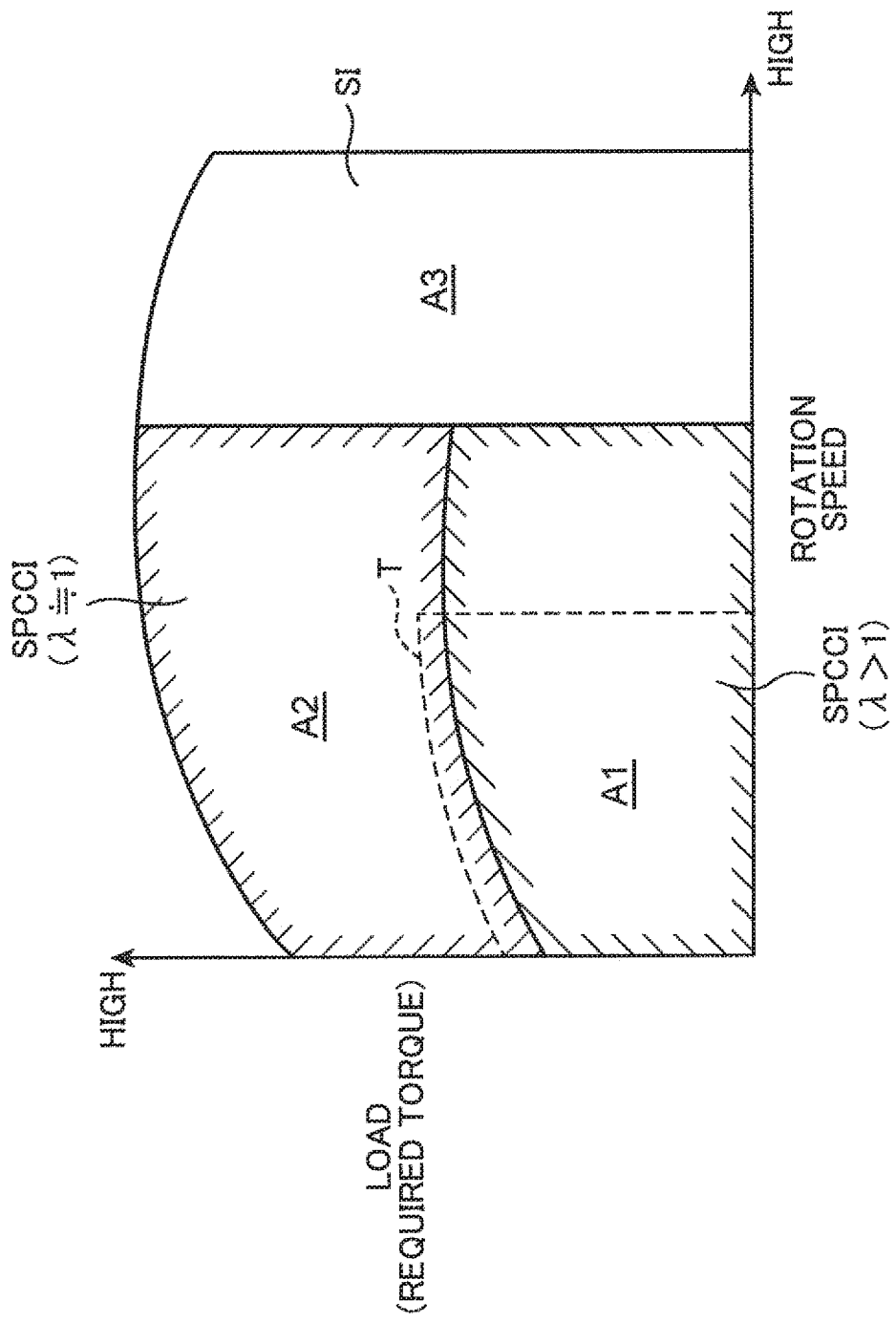
FIG. 4 is an operation map in which an operation region of the engine is divided by a difference in control of a combustion mode.

FIG. 4 is an operation map used when the engine is warm, in which the operation region of the engine is divided by a difference in control of the combustion mode. In the following description, being high (low) in load on the engine is equivalent to being high (low) in required torque to the engine.

As indicated in FIG. 4, when the engine is in a warm state, the operation region of the engine is roughly divided into three operation regions A1 to A3 in accordance with the difference in combustion mode. These operation regions A1 to A3 are referred to as a first operation region A1, a second operation region A2, and a third operation region A3, respectively.

The third operation region A3 is a high-speed region having a high rotation speed. The first operation region A1 is a low-medium-speed, low-load region except a part of the high-load side from a region on the low-speed side relative to the third operation region A3. The second operation region A2 is a region other than the first and third operation regions A1 and A3, that is, a low-medium-speed, high-load region. Hereinafter, the combustion mode and the like selected in each operation region will be described in order.

(First and Second Operation Regions)

In the low-medium-speed, low-load first operation region A1 and the low-medium-speed, high-load second operation region A2, partial compression ignition combustion (hereinafter, this is referred to as SPCCI combustion) where SI combustion and CI combustion are combined is executed. The SI combustion is a combustion mode in which a mixture is ignited by sparks generated from the ignition plug 16 and the mixture is forcibly combusted by flame propagation extending the combustion region from the ignition point to the periphery. The CI combustion is a combustion mode in which a mixture is combusted by self-ignition under an environment where the temperature and pressure have been sufficiently increased by compression of the piston 5 or the like. The SPCCI combustion in which the SI combustion and the CI combustion are combined is a combustion mode in which a portion of the mixture in the combustion chamber 6 is SI combusted by spark ignition performed under an environment immediately before the mixture self-ignites, and the rest of the mixture in the combustion chamber 6 is CI combusted by self-ignition (by further increasing the temperature and pressure with SI combustion) after the SI combustion. It is to be noted that "SPCCI" is an abbreviation of "Spark Controlled Compression Ignition".

Figure 5:
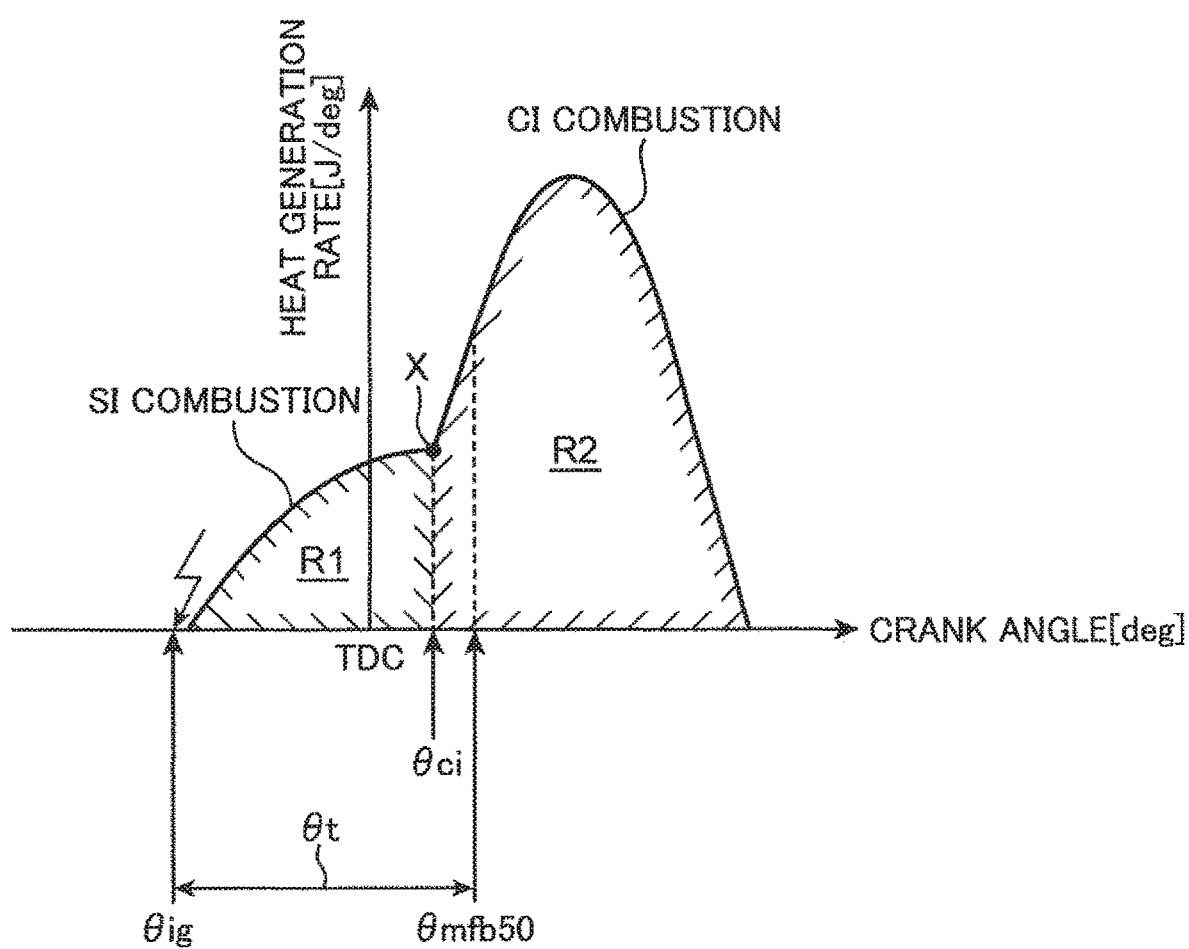
FIG. 5 is a graph indicating a waveform of a heat generation rate during SPCCI combustion (partial compression ignition combustion)

FIG. 5 is a graph indicating a combustion waveform when the SPCCI combustion is performed as described above, i.e., a change in the heat generation rate (J/deg) according to the crank angle. As indicated in the figure, in the SPCCI combustion, heat generation by the SI combustion and heat generation by the CI combustion occur successively in this order. At this time, due to the property that the combustion speed of the CI combustion is faster, the rise of heat generation is steeper in the CI combustion than in the SI combustion. For this reason, the waveform of the heat generation rate in the SPCCI combustion has an inflection point X that appears at the timing (θci described later) of switching from the SI combustion to the CI combustion.

Here, in the SPCCI combustion in which the SI combustion and the CI combustion are combined, the ratio between the SI combustion and the CI combustion is controlled in accordance with the operation conditions. In the present embodiment, each portion of the engine is controlled such that the SI rate, which is the ratio of the heat generation amount by the SI combustion to the total heat generation amount by the SPCCI combustion (SI combustion and CI combustion), becomes an appropriate value.

The SI rate can be defined as follows. In FIG. 5, a crank angle θci corresponding to the inflection point X at which the combustion mode is switched from the SI combustion to the CI combustion is defined as the start timing of the CI combustion. In this case, it can be considered that the heat generation amount by the SI combustion corresponds to an area R1 of the waveform of the heat generation rate located on the advancing side relative to the θci (start timing of the CI combustion) and the heat generation amount by the CI combustion corresponds to an area R2 of the waveform of the heat generation rate located on the retarding side relative to the θci. The SI rate can be defined as R1/(R1+R2) using the areas R1 and R2.

In the first and second operation regions A1 and A2 where the SPCCI combustion is performed, each portion of the engine is controlled such that the SI rate and the θci coincide with a predetermined target value (crank angle). That is, in the first and second operation regions A1 and A2, the target SI rate, which is a target value of the SI rate, and the target θci, which is a target value of θci, are determined for each of various conditions in which the engine load and the engine rotation speed are different. Then, a plurality of control amounts such as the timing of spark ignition (ignition timing) by the ignition plug 16, the injection amount and injection timing of the fuel from the injector 15, and the EGR rate (external EGR rate and internal EGR rate) are controlled so as to be in combination that can realize the target SI rate and the target θci. It is to be noted that the external EGR rate is the weight ratio of the external EGR gas (exhaust gas recirculated to the combustion chamber 6 through the EGR passage 51) to the total gas in the combustion chamber 6, and the internal EGR rate is the weight ratio of the internal EGR gas (combusted gas remaining in the combustion chamber 6 by the internal EGR) to the total gas in the combustion chamber 6.

For example, the ignition timing and the fuel injection amount and injection timing are determined by a predetermined map in consideration of the target SI rate and the target θci. That is, the ignition timing and the fuel injection amount and injection timing suitable for realizing the target SI rate and the target θci are stored in the map for each condition of the engine load and the engine rotation speed. The ECU 100 controls the injector 15 and the ignition plug 16 in accordance with the ignition timing and the fuel injection amount and injection timing stored in the map.

On the other hand, the external EGR rate and the internal EGR rate are determined by calculation using a predetermined model formula. That is, using a predetermined model formula, the ECU 100 calculates, for each combustion cycle, the cylinder inner temperature (target cylinder inner temperature) required at the time of spark ignition in order to achieve the target SI rate and target θci, and determines the opening degree of the EGR valve 53 and the valve timings of the intake and exhaust valves 11 and 12 on the basis of the calculated target cylinder inner temperature. More specifically, by substituting various parameters including the temperature of the intake air (fresh air) detected by the first and second intake air temperature sensors SN5 and SN7 and the valve closing timing (IVC) of the intake valve 11, which is a time point when the compression of the combustion chamber 6 is substantially started, into the model formula with the parameters as input elements, the ECU 100 calculates the external EGR rate and the internal EGR rate necessary to achieve the target cylinder inner temperature. Then, the ECU 100 calculates, as a target opening degree, the opening degree of the EGR valve 53 necessary for achieving the calculated external EGR rate, and controls the EGR valve 53 so as to achieve the target opening degree.

In the first and second operation regions A1 and A2, the throttle valve 32 is controlled as follows together with the control of the ignition timing and the injection amount and injection timing described above. In the first operation region A1, basically, the opening degree of the throttle valve 32 is set such that more air than the air amount corresponding to the theoretical air-fuel ratio is introduced into the combustion chamber 6 through the intake air passage 30 (so as to be an air excess ratio $\lambda>1$). That is, the opening degree of the throttle valve 32 is set such that the air-fuel ratio (A/F), which is the weight ratio between the air (fresh air) and fuel in the combustion chamber 6, becomes larger than the theoretical air-fuel ratio (14.7) (so as to be the air excess ratio $\lambda>1$). In the second operation region A2, on the other hand, the opening degree of the throttle valve 32 is set such that the air amount corresponding to the theoretical air-fuel ratio is introduced into the combustion chamber 6, that is, the air-fuel ratio substantially coincides with the theoretical air-fuel ratio (so as to become $\lambda \approx 1$).

(Third Operation Region)

Normal SI combustion is executed in the third operation region A3, in which the rotation speed is higher than that in the first and second operation regions A1 and A2. For example, fuel is injected from the injector 15 for a predetermined period overlapping at least part of the intake stroke, and spark ignition by the ignition plug 16 is executed at a later stage of the compression stroke. Then, the SI combustion is started by this spark ignition, and the entire mixture in the combustion chamber 6 combusts by flame propagation.

In the third operation region A3, the throttle valve 32 is set at an opening degree such that an air amount corresponding to or less than the theoretical air-fuel ratio is introduced into the combustion chamber 6, i.e., an opening degree such that the air-fuel ratio in the combustion chamber 6 becomes a value equal to or slightly smaller than the theoretical air-fuel ratio ($\lambda \leq 1$).

It is to be noted that in the first to third operation regions A1 to A3, the supercharger 33 is turned off in the region inside a supercharger line T indicated in FIG. 4, and the supercharger 33 is turned on in the region outside the supercharger line T. In the region inside the supercharger line T where the supercharger 33 is turned off, i.e., on the low-speed side of the first operation region A1, the electromagnetic clutch 34 is released to release the coupling between the supercharger 33 and the engine body, and the bypass valve 39 is fully opened, thereby stopping supercharging by the supercharger 33. On the other hand, in the region outside the supercharger line T where the supercharger 33 is turned on, i.e., on the high-speed side of the first operation region A1, the electromagnetic clutch 34 is engaged to couple the supercharger 33 and the engine body 1, thereby performing supercharging by the supercharger 33. At this time, the opening degree of the bypass valve 39 is controlled such that the pressure (supercharging pressure) in the surge tank 36 detected by the second intake air pressure sensor SN8 coincides with a target pressure determined in advance for each engine operation condition (conditions such as rotation speed and load).

[4. Control During SPCCI Combustion Based on Combustion Centroid]

In the above-described engine, in order to suppress variation in torque between the cylinders, it is necessary to perform combustion control of the cylinders 2a to 2d in accordance with the engine operation state (rotation speed and load). In this case, if the combustion conditions of the cylinders 2a to 2d are the same, it is considered that the fuel injection amount and injection timing and the like are controlled such that the air-fuel ratio (A/F) of the cylinders 2a to 2d of the engine is equalized (A/F matching control). In reality, however, the combustion conditions of the cylinders 2a to 2d are not necessarily the same, and, depending on the engine operation state, the A/F matching control may cause fuel economy deterioration and NOx increase. In particular, this tendency is observed in the first operation region A1 where the air-fuel ratio becomes larger than the theoretical air-fuel ratio ($\lambda>1$). One of the factors is considered to be an influence of variation in the internal EGR rate (amount of internal EGR) and the like. For example, in the case of the engine described above, the internal EGR rate of each of the cylinders 2a to 2d is uniformly determined by calculation using the predetermined model formula as described above, and the valve overlap period of the intake valve 11 and the exhaust valve 12 in each of the cylinders 2a to 2*d* is controlled so as to achieve the determined internal EGR rate. However, there is a difference between the internal EGR rate based on the model formula and the actual internal EGR rate, and the degree of the difference also varies among the cylinders 2*a* to 2*d*. Specifically, in the present embodiment, the EGR rate of the #1 cylinder 2*a* tends to be higher than that of each of the other cylinders 2*b* to 2*d*. It is presumed that this is because, as illustrated in FIG. 2, the #1 cylinder 2*a* of the exhaust manifold 42 is closest to the collection portion 44, and the combusted gas is easily led back to the #1 cylinder 2*a* when the internal EGR is executed (during the valve overlap period).

Therefore, the inventors of the present application have focused on the G/F matching control in which the fuel injection amount is controlled such that the gas air-fuel ratio (G/F; ratio between the mass of gas containing air and combusted gas and the mass of fuel) of each of the cylinders 2*a* to 2*d* is equalized. It was experimentally confirmed that in the first operation region A1, performing such G/F matching control can suppress the variation in torque between cylinders while suppressing the fuel economy deterioration and the NOx increase as described above.

However, unlike the A/F of each cylinder that can be estimated relatively accurately by the sensor output, it is difficult to accurately grasp the G/F of each cylinder by the sensor output. As a result of intensive researches on this point, the inventors of the present application have experimentally obtained a finding that there is a correlation between a period θt (referred to as a 50% combustion period θt) from the ignition start timing (ignition timing big) by the ignition plug 16 to the combustion centroid timing (θmfb 50; timing at which the fuel having a mass ratio of 50% of the fuel supplied to the cylinder in one combustion cycle combusts) and the G/F, as indicated in FIG. 5. That is, if the 50% combustion period θt in each of the cylinders 2*a* to 2*d* is equalized, the G/F of each cylinder can be substantially equalized, thereby allowing variation in torque between the cylinders to be suppressed while suppressing fuel economy deterioration and NOx increase. The control during the SPCCI combustion described below is based on the above finding by the inventors of the present application.

Note that, in FIG. 5, for convenience, the θci (CI combustion start timing) corresponding to the inflection point X of switching from the SI combustion to the CI combustion and the combustion centroid timing θmfb 50 are illustrated at different timings (crank angle), but it can be said that the timings of the θci and the θmfb 50 are almost the same timing. In this example, the combustion centroid timing θmfb 50 corresponds to the "predetermined mass combustion timing" of the present invention.

Figure 6:
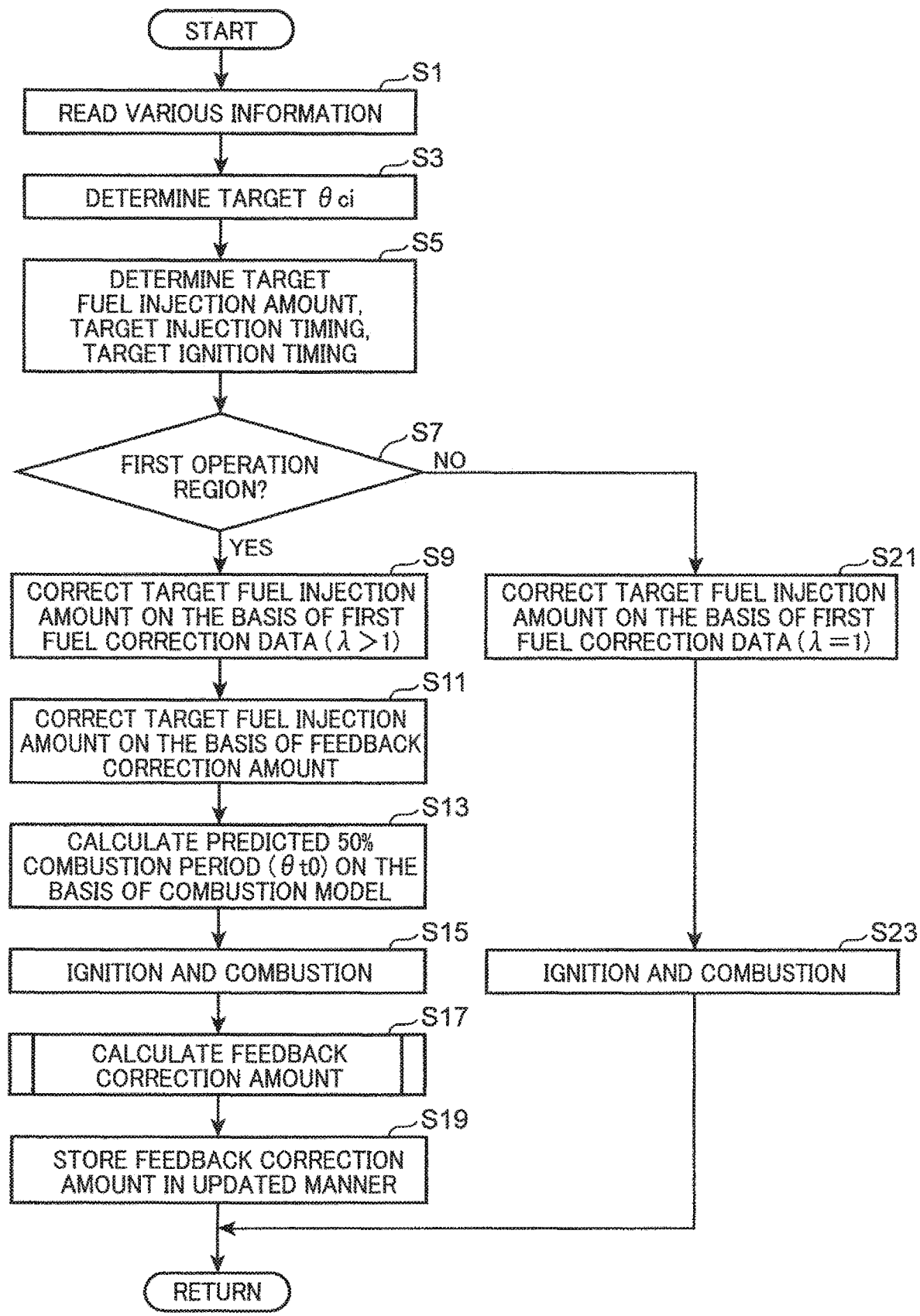
FIG. 6 is a flowchart presenting control by ECU during operation by SPCCI combustion.
Figure 7:
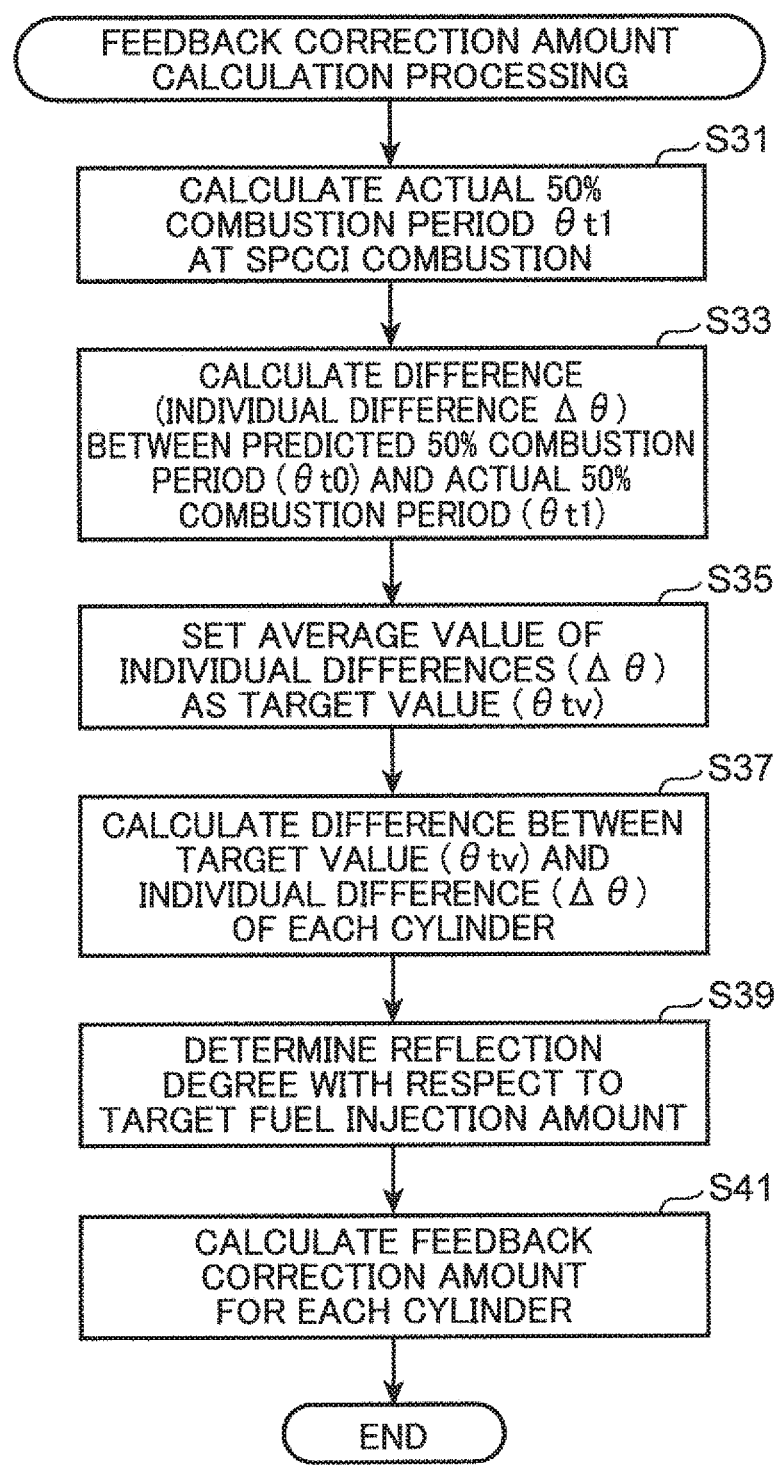
FIG. 7 is a flowchart (subroutine) presenting processing of step S17 in the flowchart of FIG. 6, FIGS. 8A-D are charts indicating an example of first fuel correction data ($\lambda$>1) for correcting a target fuel injection amount, in which FIG. 8A indicates the correction data of a #1 cylinder, FIG. 8B indicates the correction data of a #2 cylinder, FIG. 8C indicates the correction data of a #3 cylinder, and FIG. 8D indicates the correction data of a #4 cylinder.

FIG. 6 is a flowchart presenting control by the ECU 100 during operation by the SPCCI combustion, i.e., in the first and second operation regions A1 and A2 in the operation map of FIG. 4, and FIG. 7 is a flowchart presenting the processing (subroutine) in step S17 of the flowchart of FIG. 6.

When the control presented in the flowchart of FIG. 6 starts, the ECU 100 reads information from various sensors (step S1), determines the target θci, which is a target value of the θci, on the basis of the engine rotation speed detected by the crank angle sensor SN1 and the engine load specified from a detection value (accelerator opening degree) of the accelerator sensor SN11, a detection value (intake air flow rate) of the airflow sensor SN4, and the like (step S3), and determines a target ignition timing and a target fuel injection amount and a target injection timing suitable for achieving the target θci (step S5). The determination of the target θci and the determination of the target fuel injection amount, the target injection timing and the target ignition timing is performed on the basis of a predetermined map or the like.

Next, on the basis of the engine rotation speed and the engine load, the ECU 100 determines whether the current operation point is in the first operation region A1, i.e., in an operation region where the SPCCI combustion is executed in a lean state where the air-fuel ratio is larger than the theoretical air-fuel ratio (step S7). Here, if the determination is Yes, the ECU 100, on the basis of the first fuel correction data for λ>1 stored in advance, corrects the target fuel injection amount determined in step S5 (step S9).

The first fuel correction data for λ>1 is data in which the fuel correction amount is defined such that the differences and variations are corrected on the basis of the tendency of the difference between the internal EGR rate of each of the cylinders 2*a* to 2*d* obtained on the basis of the model formula and the actual internal EGR rate and the tendency of the variation in the actual internal EGR rate between the cylinders. Specifically, the relationship between the internal EGR rate (theoretical value) on the basis of the model formula and the fuel correction amount is defined. It is to be noted that, in addition to the data for the first operation region A1, i.e., the data for λ>1, the data for the second operation region A2, i.e., the data for λ=1, are set as the first fuel correction data, and in step S21 described later, each target fuel injection amount is corrected on the basis of the first fuel correction data for λ=1.

Figure 8A:
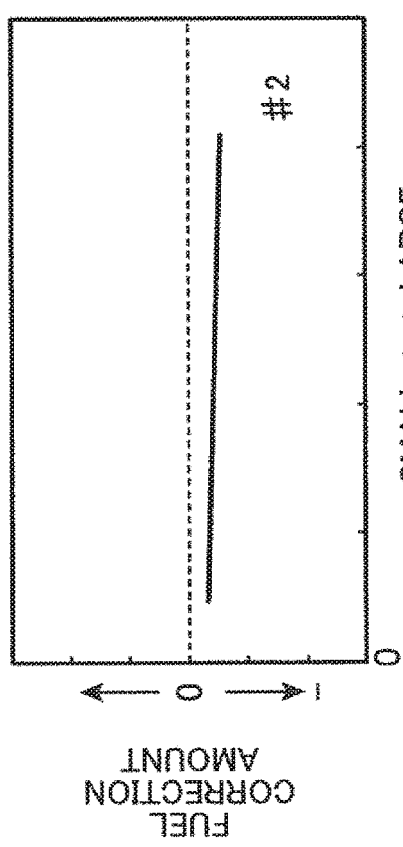
Figure 8C:
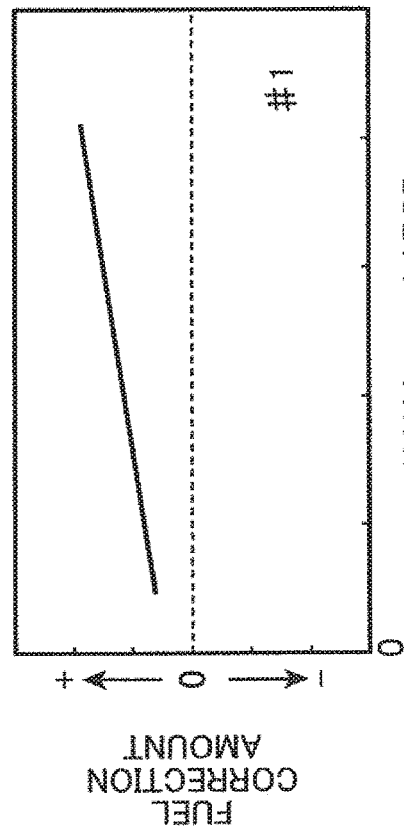
Figure 8B:
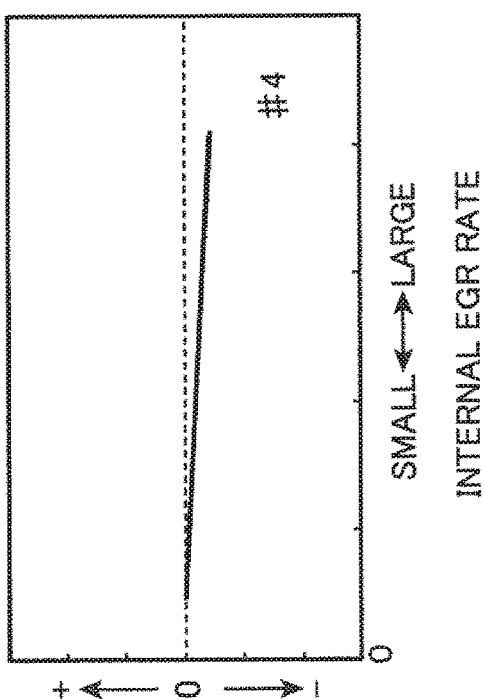
Figure 8D:
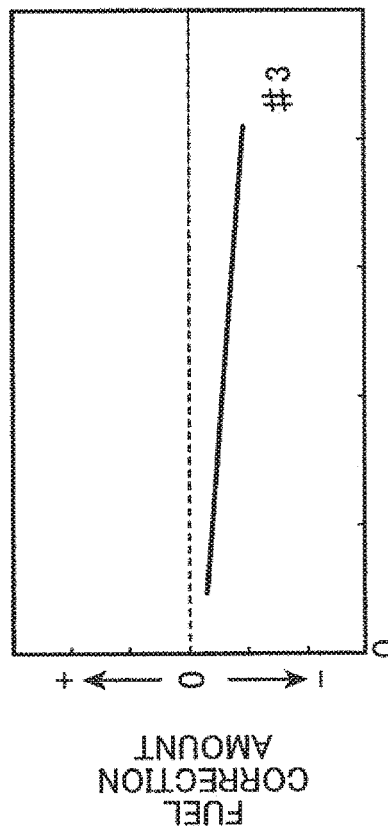

FIGS. 8A-D indicate an example of the first fuel correction data for λ>1, in which FIG. 8A indicates data of the #1 cylinder 2*a*, FIG. 8B indicates data of the #2 cylinder 2*b*, FIG. 8C indicates data of the #3 cylinder 2*c*, and FIG. 8D indicates data of the #4 cylinder 2*d*. In the example indicated in FIGS. 8A-D, the data of the #2 to #4 cylinders 2*b* to 2*d* are substantially approximate, in which the fuel correction amount is set to such an extent that the target fuel injection amount is maintained or slightly decreased. More specifically, the relationship between the internal EGR rate and the fuel correction amount is set such that the higher the internal EGR rate becomes, the relatively higher the negative (−) fuel correction amount becomes. On the other hand, in the data of the #1 cylinder 2*a*, the fuel correction amount is set so as to increase the target fuel injection amount. More specifically, the relationship between the internal EGR rate and the fuel correction amount is set such that the higher the internal EGR rate becomes, the relatively higher the positive (+) fuel correction amount becomes. The fuel correction amount of the #1 cylinder 2*a* of the #1 cylinder 2*a* to #4 cylinder 2*d* is set such that the ratio of correction becomes relatively larger than that of the other cylinders 2*b* to 2*d*. This is because, due to the actual EGR rate (amount) being structurally affected by the exhaust manifold 42, the actual EGR rate of the #1 cylinder 2*a* tends to be higher than the EGR rate by the model formula, whilst the actual EGR rate of the other cylinders 2*b* to 2*d* tends to be slightly lower than the EGR rate by the model formula.

In step S9, specifically, the ECU 100 calculates the internal EGR rate of each of the cylinders 2*a* to 2*d* using the model formula, determines the fuel correction amount of each of the cylinders 2*a* to 2*d* on the basis of this calculation result and the first fuel correction data (FIGS. 8A-D), and corrects the target fuel injection amount of each of the cylinders 2*a* to 2*d* on the basis of the fuel correction amount.

Next, on the basis of the feedback correction amount obtained in the previous combustion cycle, the ECU 100 further corrects the target fuel injection amount corrected in step S9 (step S11). Thus, the final target fuel injection amount is determined.

When the final target fuel injection amount is determined, the ECU 100 specifies, on the basis of the target fuel injection amount and the current operation state (rotation speed and load), the combustion centroid timing θmfb 50 from the combustion model set in advance, and calculates, for each of the cylinders 2a to 2d, a predicted 50% combustion period θt0 (corresponds to the "predicted combustion period" of the present invention), which is a period from the ignition timing θig to the combustion centroid timing θmfb 50 in the combustion model (step S13). It is to be noted that the combustion model is a model in which an ideal combustion mode for each operation state under a predetermined condition is determined in advance.

Next, the ECU 100 moves the process flow on to step S15, where the ECU 100 causes the injector 15 to inject, at the target injection timing determined in step S5, the fuel of the final target fuel injection amount determined in step S11, and causes the ignition plug 16 to perform ignition at the ignition timing determined in step S5. This ignition triggers the SPCCI combustion of the mixture.

Next, the ECU 100 moves the process flow on to step S17, where the ECU 100 calculates a feedback correction amount for equalizing (i.e., eliminating variations) the 50% combustion period θt between the cylinders (step S17).

FIG. 7 is a flowchart (subroutine) presenting the processing of step S17 in detail. When the control presented in this flowchart starts, the ECU 100 obtains the combustion centroid timing θmfb 50 (corresponds to the "actual combustion timing" of the present invention) at the SPCCI combustion in step S15, and calculates the actual 50% combustion period θt1 (corresponds to the "actual combustion period" of the present invention), which is the actual period from the ignition timing θig to the combustion centroid timing θmfb 50 (step S31).

Specifically, the ECU 100 calculates, on the basis of the waveform of the cylinder inner pressure detected by the cylinder inner pressure sensor SN3 in a predetermined period overlapping the combustion period (period from the combustion start to end) of the SPCCI combustion, the heat generation amount with combustion for each crank angle, calculates, on the basis of the heat generation amount data for each crank angle, the combustion centroid timing θmfb 50 in which 50% mass equivalent of the fuel has been combusted, and calculates the period from the actual ignition timing θig (target ignition timing determined in step S5) to the combustion centroid timing θmfb 50, i.e., the actual 50% combustion period θt1.

Next, the ECU 100 calculates, for each of the cylinders 2a to 2d, the deviation between the predicted 50% combustion period θt0 obtained in step S13 of FIG. 6 and the actual 50% combustion period θt1 calculated in step S31 (step S33), calculates an average value of the deviations (referred to as individual differences Δθ) of each of the cylinders 2a to 2d, and sets the average value as a target value θtv (step S35).

Next, the ECU 100 calculates the deviation between the target value θtv and the individual difference Δθ of each of the cylinders 2a to 2d (step S37), and determines, on the basis of the result and the predetermined second fuel correction data, the reflection degree of the individual difference Δθ with respect to the target fuel injection amount (step S39). The reflection degree is a parameter indicating whether or not correction of the target fuel injection amount is required and, in the case of correction, how much degree it is corrected, and a correction coefficient is an example of the reflection degree. Accordingly, the reflection degree can also be referred to as a correction degree.

Figure 9:
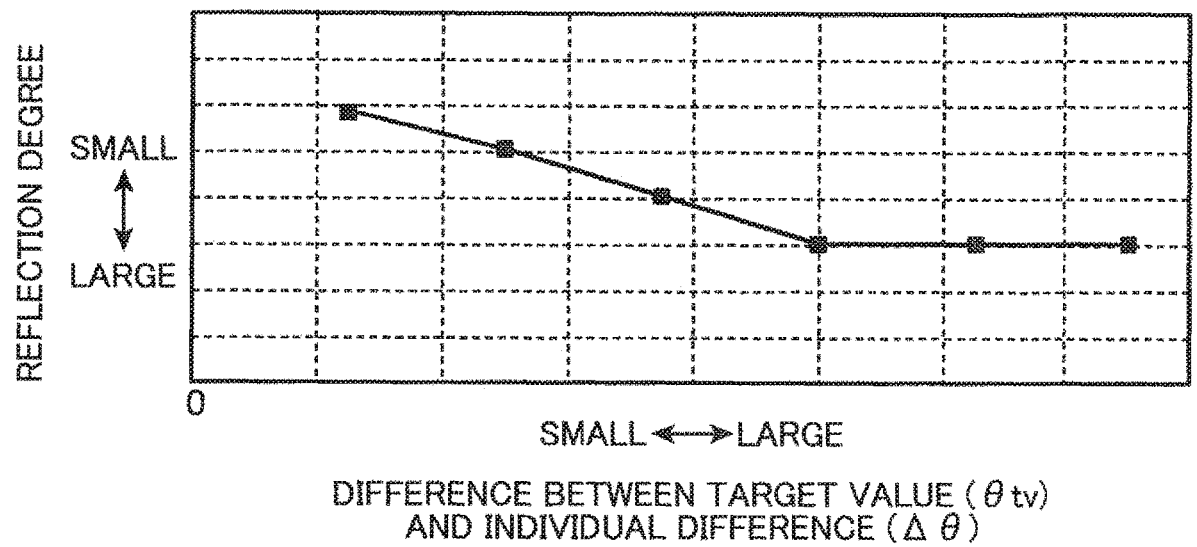
FIG. 9 is a chart indicating an example of second fuel correction data for correcting a target fuel injection amount.

FIG. 9 indicates an example of the second fuel correction data. As indicated in the figure, the second fuel correction data defines the relationship between the deviation (calculated value in step S37) between the target value θtv and the individual difference Δθ and the reflection degree. In the present embodiment, generally, the above relationship is set such that the relatively larger the deviation between the target value θtv and the individual difference Δθ becomes, the relatively larger the reflection degree becomes. However, when the deviation between the target value θtv and the individual difference Δθ exceeds a specific value, the reflection degree is maintained at a constant value (maximum value).

When the reflection degree for each cylinder is determined, the ECU 100 calculates a specific fuel correction amount (feedback correction amount) with respect to the target fuel injection amount for each cylinder on the basis of the reflection degree (step S41). The feedback correction amount is calculated by substituting a numerical value indicating the reflection degree obtained in step S39 into a predetermined model formula, for example.

When the feedback correction amount of each of the cylinders 2a to 2d is calculated, the ECU 100 terminates the processing indicated in the flowchart of FIG. 7 and moves the process flow on to step S19 of FIG. 6. In step S19, the ECU 100 stores, in an updated manner, the feedback correction amount calculated in step S41 of FIG. 7 (step S19), and then returns the process flow to step S1.

In step S7 of the flowchart of FIG. 6, in a case where the current operation point is determined not to be the first operation region A1 (No in step S7), i.e., in a case where the current operation point is determined to be the second operation region A2, the ECU 100 moves the process flow on to step S21. In step S21, on the basis of the first fuel correction data for λ=1 stored in advance, the ECU 100 corrects the target fuel injection amount determined in step S5 (step S21).

It is to be noted that like similarly to the first fuel correction data for λ>1, the first fuel correction data for λ=1 also defines the relationship between the internal EGR rate (theoretical value) based on the model formula and the fuel correction amount. The relationship between the internal EGR rate and the fuel correction amount is defined in the first fuel correction data for λ=1 such that the difference between the internal EGR rate of each of the cylinders 2a to 2d on the basis of the model formula and the actual internal EGR rate can be corrected exclusively.

Next, the ECU 100 moves the process flow on to step S23, where the ECU 100 causes the injector 15 to inject, at the target injection timing determined in step S5, the fuel of the final target fuel injection amount determined in step S21, and causes the ignition plug 16 to perform ignition at the ignition timing determined in step S5. This ignition triggers the SPCCI combustion of the mixture. Thereafter, the ECU 100 returns the process flow to step S1.

Figure 10A:
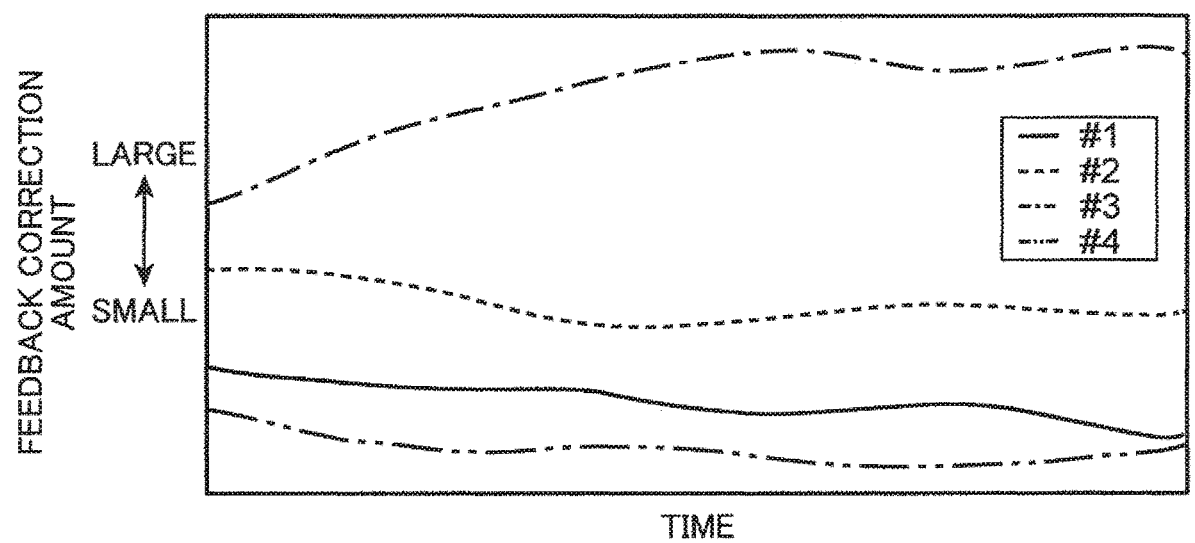
FIG. 10A is a chart indicating a chronological change of a feedback correction amount.
Figure 10B:
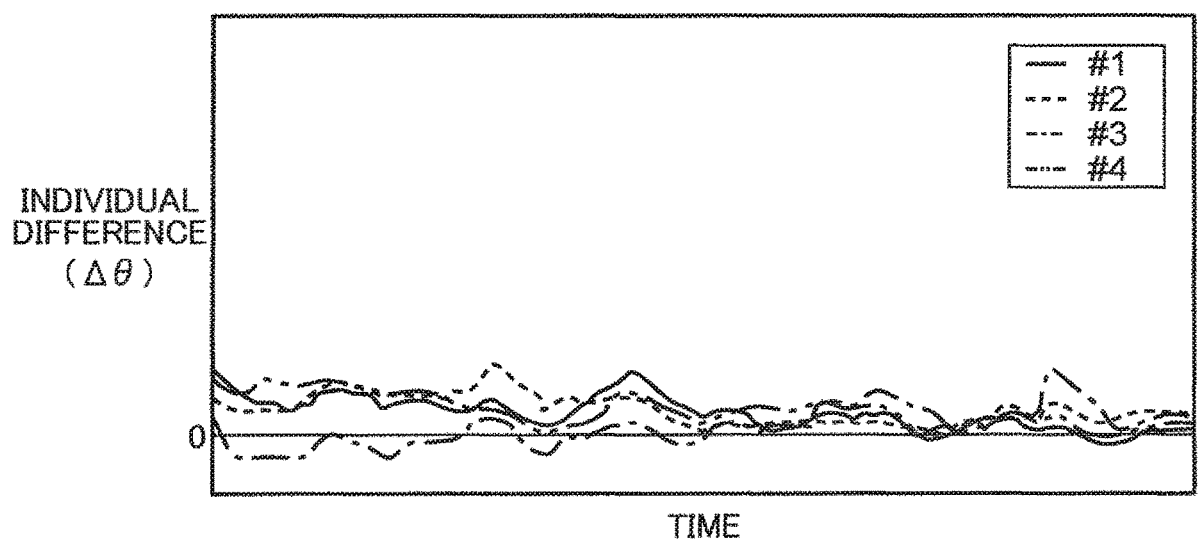
FIG. 10B is a chart (graph) indicating a chronological change of a deviation (individual difference) between a predicted 50% combustion period and an actual 50% combustion period.

FIG. 10A is a graph indicating a chronological change of the feedback correction amount of the target fuel injection based on the above-described control by the ECU 100, and FIG. 10B is a graph indicating a chronological change of the individual difference Δθ of each of the cylinders 2a to 2d, i.e., the deviation between the predicted 50% combustion period θt0 based on the combustion model and the actual 50% combustion period θt1.

As indicated in FIG. 10B, it can be considered that according to the above control, the value of the individual difference Δθ of each cylinder converges to a constant value as time elapses. That is, it can be considered that the variation of the 50% combustion period θt of each of the cylinders 2a to 2d is corrected and the 50% combustion period θt of each of the cylinders 2a to 2d becomes equalized as time elapses.

[5. Effects]

As described above, in the embodiment described above, in the first operation region A1 where the A/F becomes larger than the theoretical air-fuel ratio (λ>1) of the operation regions where the SPCCI combustion is executed, the target fuel injection amount of each of the cylinders 2a to 2d is controlled such that the period (50% combustion period θt) from the ignition start big by the ignition plug 16 to the combustion centroid timing θmfb 50 is equalized. As described above, there is a correlation between the 50% combustion period θt and the G/F, and hence, according to the embodiment described above, the G/F of each of the cylinders 2a to 2d can be substantially equalized.

Therefore, according to the embodiment described above, it is possible to suppress variation in torque between the cylinders while suppressing fuel economy deterioration and NOx increase in the operation region of λ>1 (first operation region A1).

Figure 11:
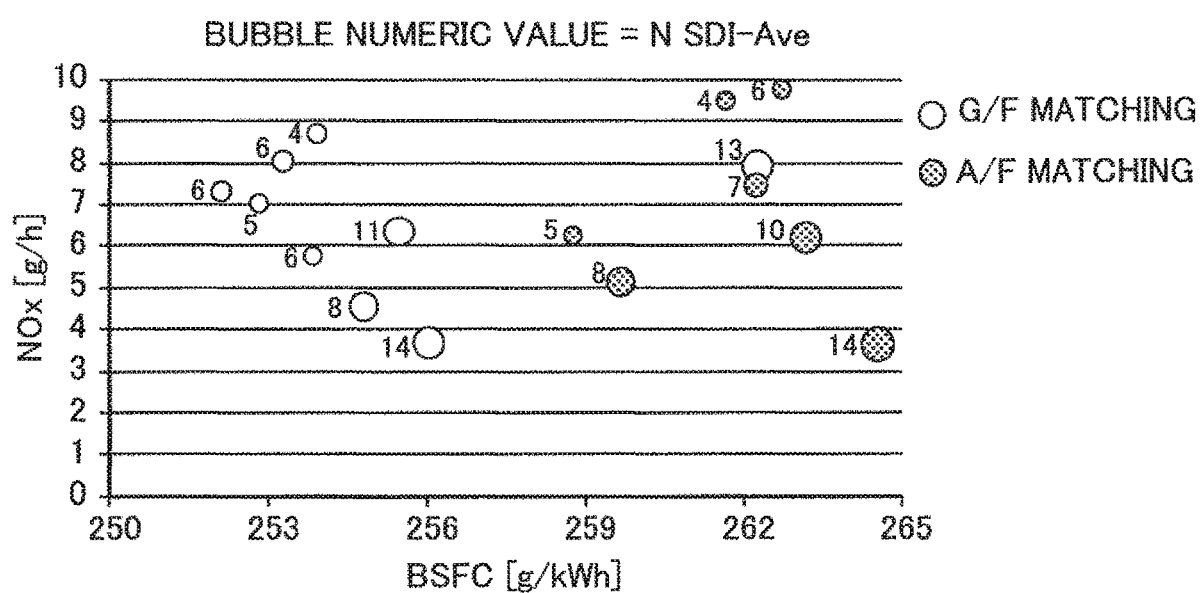
FIG. 11 is a chart indicating an example of a result of a comparison test of combustion performance between G/F matching control and A/F matching control.
Figure 12:
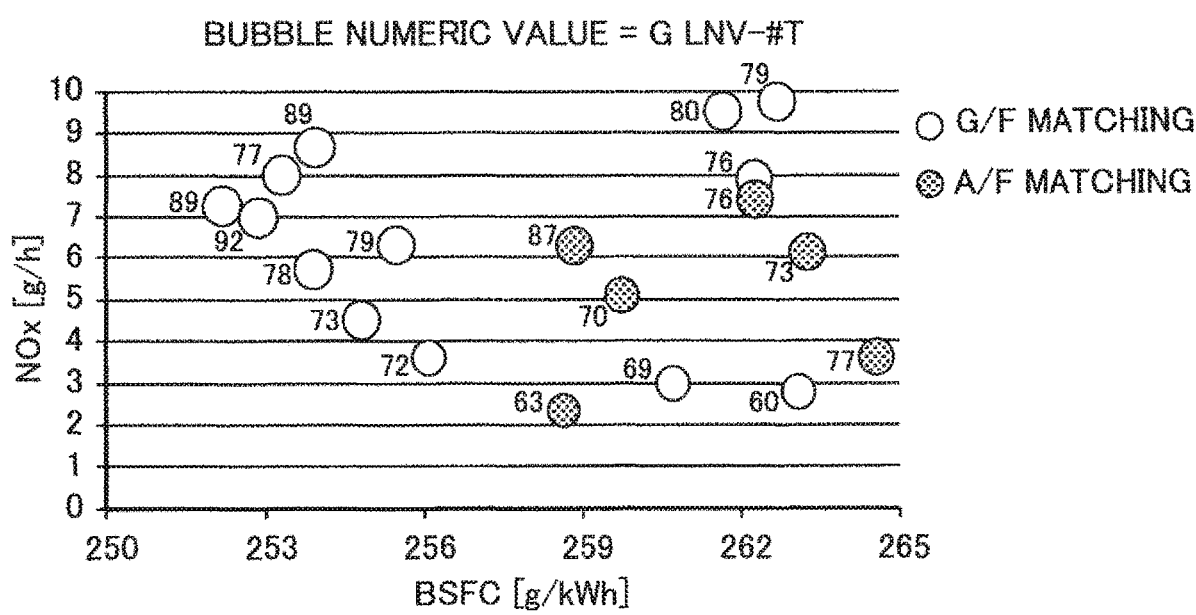
FIG. 12 is a chart indicating an example of a result of the comparison test of combustion performance between the G/F matching control and the A/F matching control.

FIG. 11 indicates a test result of a comparison in fuel economy, NOx discharge amount, and SDI between the controls of the embodiment described above, i.e., the G/F matching control and the A/F matching control by equalizing the 50% combustion period θt of each of the cylinders 2a to 2d, and FIG. 12 indicates a test result of a comparison in fuel economy, NOx discharge amount, and LNV between the G/F matching control and the A/F matching control.

The numerical value in the bubbles in FIG. 11 indicates the value of SDI. The SDI is a numerical value indicating the variation degree in the combustion pressure fluctuation of each of the cylinders 2a to 2d, and indicating that the relatively smaller the value is, the smaller the variation in the combustion pressure fluctuation between the cylinders is, i.e., the smaller the variation in the torque of each of the cylinders 2a to 2d is. The numerical value in the bubbles in FIG. 12 indicates the value of LNV. The LNV (%) is one of the indices indicating the combustion state, is defined by [indicated effective pressure (minimum) at combustion/indicated effective pressure (average value) at combustion]× 100 at a predetermined number of cycles (e.g., at least 300 cycles), and indicates that the relatively larger the value is, the better the combustion stability is.

From the results indicated in FIGS. 11 and 12, it can also be considered that according to the G/F matching control by equalizing the 50% combustion period θt of each of the cylinders 2a to 2d, the fuel economy is relatively good and there is no significant increase in NOx discharge amount as compared with the A/F matching control, and the combustion stability (LNV) is good and variation in torque of the cylinders 2a to 2d is little as compared with the A/F matching control.

According to the embodiment described above, in such the G/F matching control, the target fuel injection amount of each of the cylinders 2a to 2d is feedback corrected on the basis of the deviation (individual difference Δθ) between the predicted 50% combustion period θt0 obtained on the basis of the combustion model and the actual 50% combustion period θt1 calculated from the cylinder inner pressure detected by the cylinder inner pressure sensor SN3. Therefore, the variation of the 50% combustion period θt between the cylinders can be reduced rapidly and more stably as the time elapses.

In particular, in the embodiment described above, the average value of the individual differences Δθ is set as the target value θtv, and the feedback correction amount is determined on the basis of the deviation between the target value θtv and the individual difference Δθ of each of the cylinders 2a to 2d. That is, the feedback correction amount is obtained such that the individual difference Δθ of each of the cylinders 2a to 2d approaches the target value θtv. Therefore, the 50% combustion period θt of each of the cylinders 2a to 2d can be equalized without being restricted to the predicted 50% combustion period θt1 based on the combustion model. In other words, the actual combustion period of each cylinder can be equalized while maintaining the degree of freedom for the 50% combustion period θt itself. For example, the feedback correction amount may be determined such that the deviation (individual difference Δθ) between the predicted 50% combustion period θt0 of the combustion model and the actual 50% combustion period θt1 approaches zero, but in this case, the 50% combustion period θt of each of the cylinders 2a to 2d is forcibly matched to the predicted 50% combustion period θt0 based on the combustion model, and it is conceivable that the combustion stability is impaired depending on the type of fuel used, for example. In this regard, according to the embodiment described above in which the average value of the individual differences Δθ, which are the deviations between the predicted 50% combustion period θt0 and the actual 50% combustion period θt1, is set as the target value θvt, and the feedback correction amount is determined on the basis of the deviation between the target value θvt and the individual difference Δθ, the 50% combustion period θt of each of the cylinders 2a to 2d can be equalized with each other without being matched with the predicted 50% combustion period θt0 of the combustion model. Therefore, there is an advantage of capable of equalizing the 50% combustion period θt of each of the cylinders 2a to 2d and eventually equalizing the G/F of each of the cylinders 2a to 2d without having a disadvantage of impairing the combustion stability as described above.

Furthermore, in the embodiment described above, when the feedback correction amount is calculated, the feedback correction amount is obtained on the basis of the second fuel correction data (see FIG. 9) in which the reflection degree is determined in accordance with the magnitude of the deviation between the target value θvt and the individual difference Δθ. Therefore, a reasonable value in accordance with the magnitude of the deviation between the target value θvt and the individual difference Δθ is calculated as the feedback correction amount such that the deviation between the target value θvt and the individual difference Δθ becomes smaller. Hence, it is possible to bring the individual difference Δθ in the cylinders 2a to 2d close to the target value θvt with good responsiveness, i.e., to equalize the 50% combustion period θt between the cylinders with good responsiveness.

Furthermore, in the embodiment described above, on the basis of the tendency of the difference between the internal EGR rate based on the model formula and the actual internal EGR rate and the tendency of the variation of the actual internal EGR rate between the cylinders, the target fuel injection amount is first corrected (step S9 of FIG. 6) on the basis of the first fuel correction data (see FIGS. 8A-D) set in advance for each cylinder so as to correct the difference and the variation, and feedback correction is performed for the corrected target fuel injection amount (step S11 of FIG. 6). That is, the target fuel injection amount is feedforward corrected so as to correct the variation of the internal EGR rate between the cylinders having a large influence on the variation of the 50% combustion period $\theta t$ for each cylinder, and the feedback correction is performed on the basis of the corrected target fuel injection amount. Therefore, according to the embodiment described above, also in this regard, there is an advantage that the 50% combustion period $\theta t$ between the cylinders can be equalized with good responsiveness. Specifically, in the embodiment described above, the actual EGR rate (amount) is structurally affected by the exhaust manifold 42, and the actual EGR rate of the #1 cylinder 2a tends to be larger than the actual EGR rate of the other cylinders 2b to 2d. However, according to the embodiment described above, the target fuel injection amount is corrected on the basis of the first fuel correction data in which the fuel correction amount of the #1 cylinder 2a is set such that the correction ratio becomes relatively larger than that of the fuel correction amount of the other cylinders 2b to 2d. Therefore, it is possible to equalize the 50% combustion period $\theta t$ between the cylinders by quickly correcting the variation in the 50% combustion period $\theta t$ between the cylinders due to the deviation of the actual EGR rate.

[6. Modification Examples and the Like]

It is to be noted that the engine and the ECU 100 according to the embodiment described above are examples of a preferred embodiment of the compression ignition type engine and the control apparatus therefor according to the present invention, and specific configurations of the compression ignition type engine and the control apparatus therefor can be appropriately changed without departing from the scope of the present invention. For example, the following configuration may be adopted.

(1) In the embodiment described above, the target fuel injection amount is corrected so as to equalize the period $\theta t$ (50% combustion period $\theta t$) from the ignition timing $\theta ig$ to the combustion centroid timing $\theta mfb$ 50, i.e., the timing at which the fuel having a mass ratio of 50% of the fuel combusts. However, the combustion mass ratio of the fuel may be a value other than 50% (e.g., 40% or 60%). In short, the G/F matching control can be substantially performed if the period from the ignition timing $\theta ig$ to the timing (predetermined mass combustion timing) at which the fuel having a predetermined mass ratio combusts is equalized in each of the cylinders 2a to 2d.

(2) The first fuel correction data (FIGS. 8A-D) and the second fuel correction data (FIG. 9) in the embodiment described above are data that are set for equalizing the 50% combustion period $\theta t$ between the cylinders with better responsiveness for an example of the embodiment, i.e., an engine including the exhaust manifold 42 as illustrated in FIG. 2, and the relationship between the internal EGR rate and the fuel correction amount in the first fuel correction data and the relationship between the magnitude of the deviation between the target value $\theta vt$ and the individual difference $\Delta\theta$ and the reflection degree in the second fuel correction data are not limited to those of the embodiment but can be appropriately changed on the basis of the specific engine structure or the like.

(3) In the embodiment described above, with the average value of the deviation (individual difference $\Delta\theta$) between the predicted 50% combustion period $\theta t0$ of the combustion model and the actual 50% combustion period $\theta t1$ as the target value $\theta vt$, the feedback correction amount is calculated such that the individual difference $\Delta\theta$ approaches the target value $\theta vt$. However, in a case where there is no disadvantage such as impairing the combustion stability, the feedback correction amount may be calculated on the basis of the deviation between the predicted 50% combustion period $\theta t0$ and the actual 50% combustion period $\theta t1$ of each cylinder such that the actual 50% combustion period $\theta t1$ of each of the cylinders 2a to 2d approaches the predicted 50% combustion period $\theta t0$ of the combustion model as a target value.

(4) In the embodiment described above, the G/F matching control is performed in the operation region (first operation region A1) of $\lambda > 1$, but in a case where, for example, a significant fuel economy deterioration and a significant NOx increase are not caused, the G/F matching control may be performed also in the operation region (second operation region A2) of $\lambda = 1$ or a region of part thereof.

The present invention described above is summarized as follows.

It is an object of the present invention to suppress variation in torque between cylinders while suppressing fuel economy deterioration and NOx increase in an engine capable of partial compression ignition combustion.

In view of the problem described above, the inventors of the present application considered that, in an engine that performs partial compression ignition combustion, in particular, in an operation region where the air-fuel ratio is larger than the theoretical air-fuel ratio, controlling the fuel injection amount such that the gas air-fuel ratio (G/F) of each cylinder is equal (referred to G/F matching control) is more effective from the viewpoint of improving fuel economy and reducing NOx than the A/F matching control. This is because, in the operation region of $\lambda > 1$, the variation in the internal EGR amount for each cylinder is considered to affect the combustibility. Good results have successfully been obtained through actually repeating tests on the G/F matching control. However, unlike the A/F of each cylinder that can be estimated relatively accurately on the basis of the sensor output, it is difficult to accurately grasp the G/F of each cylinder, and it is considered not easy to perform the G/F matching control in an actual engine. Therefore, this point has become a new problem. Then, as a result of further intensive researches, the inventors of the present application have obtained a finding that there is a correlation between the period from the ignition timing (ignition start timing) by the ignition plug to the timing of the combustion centroid (timing at which the fuel having a mass ratio of 50% of the fuel supplied to the cylinder in one combustion cycle combusts) and the G/F. That is, the inventors of the present application have obtained a finding that equalizing, in each cylinder, the combustion period from the ignition start by the ignition plug to when the fuel having a predetermined mass ratio of the fuel supplied to each cylinder in one combustion cycle combusts is equal to substantially equalizing the G/F of each cylinder, and this makes it possible to suppress variation in torque between the cylinders while suppressing fuel economy deterioration and NOx increase. The present invention is on the basis of such the finding, and is characterized by including the following configuration.

That is, the control apparatus for a compression ignition type engine according to one aspect of the present invention is a control apparatus for a compression ignition type engine that includes a plurality of cylinders, an injector injecting fuel into each of the plurality of cylinders, and an ignition plug generating a spark in each of the plurality of cylinders, in which a portion of air-fuel mixture in the cylinders is SI combusted by spark ignition, and then the remaining mixture in the cylinders is CI combusted by self-ignition. The control apparatus includes a combustion control unit controlling an ignition timing of the ignition plug such that a predetermined combustion timing becomes a target timing, and controlling a fuel injection amount by the injector such that a fuel injection amount of each of the plurality of cylinders becomes a target fuel injection amount. The combustion control unit corrects the target fuel injection amount of each of the plurality of cylinders by the injector based on a deviation between a predicted combustion period that is a period from the ignition timing by the ignition plug to a predetermined mass combustion timing and that is obtained based on a preset combustion model, and an actual combustion period that is a period from the ignition timing by the ignition plug to an actual combustion timing and that is obtained based on cylinder inner pressure detected by the plurality of cylinder inner pressure sensors, such that the period from the ignition timing by the ignition plug to the predetermined mass combustion timing that is a timing when fuel having a predetermined mass ratio combusts is equalized in each of the plurality of cylinders.

According to such a control apparatus, it is possible to equalize, in each cylinder, the period from the ignition timing by the ignition plug to when the fuel having a predetermined mass ratio combusts, i.e., to substantially equalize the G/F of each cylinder. In this case, the period from the ignition timing to the predetermined mass combustion timing in each cylinder can be equalized with good responsiveness by the feedback control in the period. Hence, it is possible to execute the G/F matching control described above, and it is possible to suppress variation in torque between cylinders while suppressing fuel economy deterioration and NOx increase in an engine that performs partial compression ignition combustion.

In the control apparatus described above, it is preferable that the combustion control unit sets, as a target value, an average value of individual differences that are deviations between the predicted combustion period and the actual combustion period for each of the plurality of cylinders, and corrects the target fuel injection amount of each of the plurality of cylinders such that a deviation between the target value and the individual differences approaches zero.

According to this configuration, the actual combustion period of each cylinder can be equalized without being restricted to the predicted combustion period based on the combustion model. In other words, the actual combustion period of each cylinder can be equalized while maintaining the degree of freedom for the actual combustion period itself.

In the control apparatus described above, it is preferable that the combustion control unit relatively increases a correction degree of the target fuel injection amount as a deviation between the predicted combustion period and the actual combustion period is relatively large.

According to this configuration, the period from the ignition timing to the predetermined mass combustion timing in each cylinder can be equalized with good responsiveness.

It is to be noted that in a case where the A/F matching control is performed in order to suppress variation in torque between cylinders, there is a case where the tendency of fuel economy deterioration and NOx increase is observed in an operation region where the air-fuel ratio becomes larger than the theoretical air-fuel ratio ($\lambda>1$).

Accordingly, in the control apparatus according to each of the aspects described above, it is preferable that, when the engine executes, in at least a portion of the operation region, a lean operation in which the air-fuel ratio that is a ratio of the air and fuel in the plurality of cylinders is higher than the theoretical air-fuel ratio, the combustion control unit corrects the target fuel injection amount of each of the plurality of cylinders based on the deviation between the predicted combustion period and the actual combustion period such that the period from the ignition timing by the ignition plug to the predetermined mass combustion timing is equalized in each of the plurality of cylinders in the portion of the operation region.

According to this configuration, it is possible to suppress variation in torque between cylinders while effectively suppressing fuel economy deterioration and NOx increase in the operation region of $\lambda>1$.

In this case, as a more specific configuration, for example, in a case where the engine includes an exhaust manifold that guides an exhaust gas discharged from the plurality of cylinders and the exhaust manifold includes a collection portion where the exhaust gas from the respective cylinders collects at a position closest to a specific cylinder in the array direction of the plurality of cylinders, the combustion control unit corrects the target fuel injection amount of each of the plurality of cylinders based on a fuel correction amount set in advance for each of the plurality of cylinders according to a magnitude of an internal EGR rate during the lean operation, and the fuel correction amount for the specific cylinder of the plurality of cylinders is set such that the correction ratio is relatively large compared to the fuel correction amount for the rest of the plurality of cylinders.

When the internal EGR is executed, in the engine including the exhaust manifold as described above, the EGR gas amount in the specific cylinder tends to be larger than that in the other cylinders and the combustion speed tends to be slower than that in the other cylinders even if the overlap period of the supply and exhaust strokes is the same. That is, the period in the specific cylinder from the ignition timing by the ignition plug to when fuel having a predetermined mass ratio combusts tends to be longer than the same period in other cylinders. However, according to the configuration described above, since the fuel correction amount of the specific cylinder is set so as to have a correction ratio larger than the fuel correction amount of the other cylinders, the variation itself between the cylinders in the period from the ignition timing to the predetermined mass combustion timing can be suppressed from the early stage in the lean operation.

Meanwhile, a control method for a compression ignition type engine according to one aspect of the present invention is a control method for a compression ignition type engine that includes a plurality of cylinders, an injector injecting fuel into each of the plurality of cylinders, and an ignition plug generating a spark in each of the plurality of cylinders, in which a portion of air-fuel mixture in the cylinders is SI combusted by spark ignition, and then the remaining mixture in the cylinders is CI combusted by self-ignition. This control method includes: a step of obtaining a target fuel injection amount of each of the plurality of cylinders; a step of correcting the target fuel injection amount of each of the plurality of cylinders based on a deviation between a predicted combustion period that is a period from the ignition timing by the ignition plug to a predetermined mass combustion timing and that is obtained based on a preset combustion model, and an actual combustion period that is a period from the ignition timing by the ignition plug to an actual combustion timing and that is obtained based on cylinder inner pressure detected by the plurality of cylinder inner pressure sensors, such that the period from the ignition timing by the ignition plug to the predetermined mass combustion timing that is a timing when fuel having a predetermined mass ratio combusts is equalized in each of the plurality of cylinders; and a step of controlling the ignition timing of the ignition plug such that a predetermined combustion timing becomes a target timing, and controlling a fuel injection amount by the injector such that a fuel injection amount of each of the plurality of cylinders becomes the target fuel injection amount.

According to such a control method, it is possible to equalize, in each cylinder, the period from the ignition timing by the ignition plug to when the fuel having a predetermined mass ratio combusts, i.e., to substantially equalize the G/F of each cylinder. Hence, it is possible to execute the G/F matching control described above, and it is possible to suppress variation in torque between cylinders while suppressing fuel economy deterioration and NOx increase in an engine that performs partial compression ignition combustion.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control apparatus for a compression ignition type engine that includes a plurality of cylinders, an injector injecting fuel into each of the plurality of cylinders, and an ignition plug generating a spark in each of the plurality of cylinders, a portion of air-fuel mixture in the plurality of cylinders being SI (Spark Ignition) combusted by spark ignition, and then remaining mixture in the plurality of cylinders being CI (Compression Ignition) combusted by self-ignition, the control apparatus comprising:

a plurality of cylinder inner pressure sensors each detecting a pressure in each of the plurality of cylinders; and a combustion control unit controlling an ignition timing of the ignition plug such that a predetermined combustion timing becomes a target timing, and controlling a fuel injection amount by the injector such that a fuel injection amount of each of the plurality of cylinders becomes a target fuel injection amount, wherein the combustion control unit sets, as a target value, an average value of individual differences that are deviations between a predicted combustion period and an actual combustion period for each of the plurality of cylinders, the predicted combustion period being a combustion period from the ignition timing by the ignition plug to a timing when fuel having a predetermined mass ratio combusts and being obtained based on a preset combustion model, and the actual combustion period being a period from the ignition timing by the ignition plug to an actual combustion timing and being obtained based on cylinder inner pressure detected by the plurality of cylinder inner pressure sensors, and corrects the target fuel injection amount of each of the plurality of cylinders such that a deviation between the target value and the individual differences approaches zero.

2. The control apparatus for the compression ignition type engine according to claim 1, wherein the combustion control unit increases a correction degree of the target fuel injection amount when a deviation between the predicted combustion period and the actual combustion period becomes larger.

3. The control apparatus for the compression ignition type engine according to claim 1, wherein the engine executes, in at least a portion of an operation region, a lean operation in which an air-fuel ratio that is a ratio of air and fuel in the plurality of cylinders is higher than a theoretical air-fuel ratio, and the combustion control unit corrects the target fuel injection amount of each of the plurality of cylinders based on the deviation between the predicted combustion period and the actual combustion period such that the period from the ignition timing by the ignition plug to the predetermined combustion timing is equalized in each of the plurality of cylinders in the portion of the operation region.

4. The control apparatus for the compression ignition type engine according to claim 3, wherein the engine includes an exhaust manifold that guides exhaust gas discharged from the plurality of cylinders, the exhaust manifold includes a collection portion where the exhaust gas from the respective cylinders collects at a position closest to a specific cylinder in an array direction of the plurality of cylinders, the combustion control unit corrects the target fuel injection amount of each of the plurality of cylinders based on a fuel correction amount set in advance for each of the plurality of cylinders according to a magnitude of an internal EGR (Exhaust Gas Recirculation) rate during the lean operation, and the combustion control unit corrects the target fuel injection amount for the specific cylinder of the plurality of cylinders such that a correction ratio of the fuel correction amount for the specific cylinder becomes larger than a correction ratio of the fuel correction amount for a rest of the plurality of cylinders.

5. A control method for a compression ignition type engine that includes a plurality of cylinders, an injector injecting fuel into the plurality of cylinders, and an ignition plug generating sparks in the plurality of cylinders, a portion of air-fuel mixture in the plurality of cylinders being SI (Spark Ignition) combusted by spark ignition, and then remaining mixture in the plurality of cylinders being CI (Compression Ignition) combusted by self-ignition, the control method comprising:

a step of obtaining a target fuel injection amount of each of the plurality of cylinders;

a step of setting, as a target value, an average value of individual differences that are deviations between a predicted combustion period and an actual combustion period for each of the plurality of cylinders, the predicted combustion period being a combustion period from an ignition timing by the ignition plug to a timing when fuel having a predetermined mass ratio combusts and being obtained based on a preset combustion model, and the actual combustion period being a period from the ignition timing by the ignition plug to an actual combustion timing and being obtained based on cylinder inner pressure detected by a plurality of cylinder inner pressure sensors, and correcting the target fuel injection amount of each of the plurality of cylinders such that a deviation between the target value and the individual differences approaches zero; and a step of controlling the ignition timing of the ignition plug such that a predetermined combustion timing becomes a target timing, and controlling a fuel injection amount by the injector such that a fuel injection amount of each of the plurality of cylinders becomes the target fuel injection amount.

6. The control apparatus for the compression ignition type engine according to claim 1, wherein the combustion control unit performs a first correction of correcting the target fuel injection amount of each of the plurality of cylinders based on a fuel correction amount set in advance for each of the plurality of cylinders according to a magnitude of an internal EGR (Exhaust Gas Recirculation) rate of the compression ignition type engine, and performs a second correction of correcting the target fuel injection amount of each of the plurality of cylinders after the first correction, the second correction correcting the target fuel injection amount of each of the plurality of cylinders such that the deviation between the target value and the individual differences approaches zero.

7. The control apparatus for the compression ignition type engine according to claim 6, wherein
- the engine includes an exhaust manifold that guides exhaust gas discharged from the plurality of cylinders,
- the exhaust manifold includes a collection portion where the exhaust gas from the respective cylinders collects at a position closest to a specific cylinder in an array direction of the plurality of cylinders, and
- the combustion control unit corrects, in the first correction, the target fuel injection amount such that a correction ratio of the fuel correction amount for the specific cylinder of the plurality of cylinders becomes larger than a correction ratio of the fuel correction amount for a rest of the plurality of cylinders.

* * * * *